US012683975B2

(12) United States Patent
Baker et al.

(10) Patent No.: US 12,683,975 B2
(45) Date of Patent: Jul. 14, 2026

(54) METHOD AND APPARATUS FOR SECURELY CO-BROWSING DOCUMENTS AND MEDIA URLS

(71) Applicant: Glance Networks, Inc., Wakefield, MA (US)

(72) Inventors: Richard L. Baker, Belmont, MA (US); Andrew Norman, Great Falls, VA (US); Brendan Ronan, Watertown, MA (US); Ellis Oliver Jones, Newburyport, MA (US); Edward F. Hardebeck, Brookline, MA (US); Edward J. McGowan, Winchester, MA (US); Deborah Mendez, Arlington, MA (US)

(73) Assignee: Glance Networks, Inc., Wakefield, MA (US)

( * ) Notice: Subject to any disclaimer, the term of this patent is extended or adjusted under 35 U.S.C. 154(b) by 139 days.

(21) Appl. No.: 18/906,338

(22) Filed: Oct. 4, 2024

(65) Prior Publication Data

US 2025/0039185 A1     Jan. 30, 2025

Related U.S. Application Data

(62) Division of application No. 17/682,231, filed on Feb. 28, 2022, now Pat. No. 12,120,125.

(Continued)

(51) Int. Cl.
| | |
|---|---|
| *H04L 9/40* | (2022.01) |
| *G06F 3/14* | (2006.01) |

(Continued)

(52) U.S. Cl.
CPC .......... *H04L 63/105* (2013.01); *G06F 3/1454* (2013.01); *G06F 16/986* (2019.01);
(Continued)

(58) Field of Classification Search
CPC . H04L 63/105; H04L 63/0853; H04L 63/108; H04L 67/02; H04L 43/0852;
(Continued)

(56) References Cited

U.S. PATENT DOCUMENTS

| | | | | |
|---|---|---|---|---|
| 2009/0319672 A1* | 12/2009 | Reisman | ............. | H04L 65/1069 |
| | | | | 709/227 |
| 2015/0149645 A1* | 5/2015 | Mendez | ................ | G06F 40/143 |
| | | | | 709/227 |
| 2017/0346876 A1* | 11/2017 | Lim | ........................ | H04L 67/02 |

* cited by examiner

*Primary Examiner* — Berhanu Shitayewoldetsadik
(74) *Attorney, Agent, or Firm* — Anderson Gorecki LLP

(57) ABSTRACT

Secure sharing of a document on a co-browse session is implemented by causing a JavaScript implemented document viewer to create HTML5 description of a rendered view of a document's content, and transmitting the HTML5 description of the rendered view of the document content as a DOM elements on the co-browse session. The rendered view of the document is overlayed on the web page being co-browsed, which enables the participants to the co-browse session to collaboratively view the rendered view of the document. However, since the document itself only resides in the visitor's browser, the document itself is not transmitted on the co-browse session. Media URLs can also be shared, and the participants' views of the audio/video media is synchronized by causing the video to play locally at each participant but synchronized with the visitor. Live video of the participants to the co-browse session is also implemented.

7 Claims, 21 Drawing Sheets

Related U.S. Application Data

(60) Provisional application No. 63/154,757, filed on Feb. 28, 2021.

(51) Int. Cl.

| | |
|---|---|
| *G06F 16/958* | (2019.01) |
| *G06F 40/106* | (2020.01) |
| *G06F 40/143* | (2020.01) |
| *H04L 15/16* | (2006.01) |
| *H04L 67/02* | (2022.01) |
| *H04L 67/1095* | (2022.01) |
| *H04L 43/0852* | (2022.01) |

(52) U.S. Cl.
CPC .......... *G06F 40/106* (2020.01); *G06F 40/143* (2020.01); *H04L 63/0853* (2013.01); *H04L 63/108* (2013.01); *H04L 67/02* (2013.01); *H04L 43/0852* (2013.01); *H04L 67/1095* (2013.01)

(58) Field of Classification Search
CPC . H04L 67/1095; H04L 63/104; G06F 3/1454; G06F 16/986; G06F 40/106; G06F 40/143; G06F 3/147; G09G 2340/10; G09G 2370/027
USPC .......................................................... 726/4
See application file for complete search history.

Visitor selects file to be shown on co-browse session

FIG. 3A

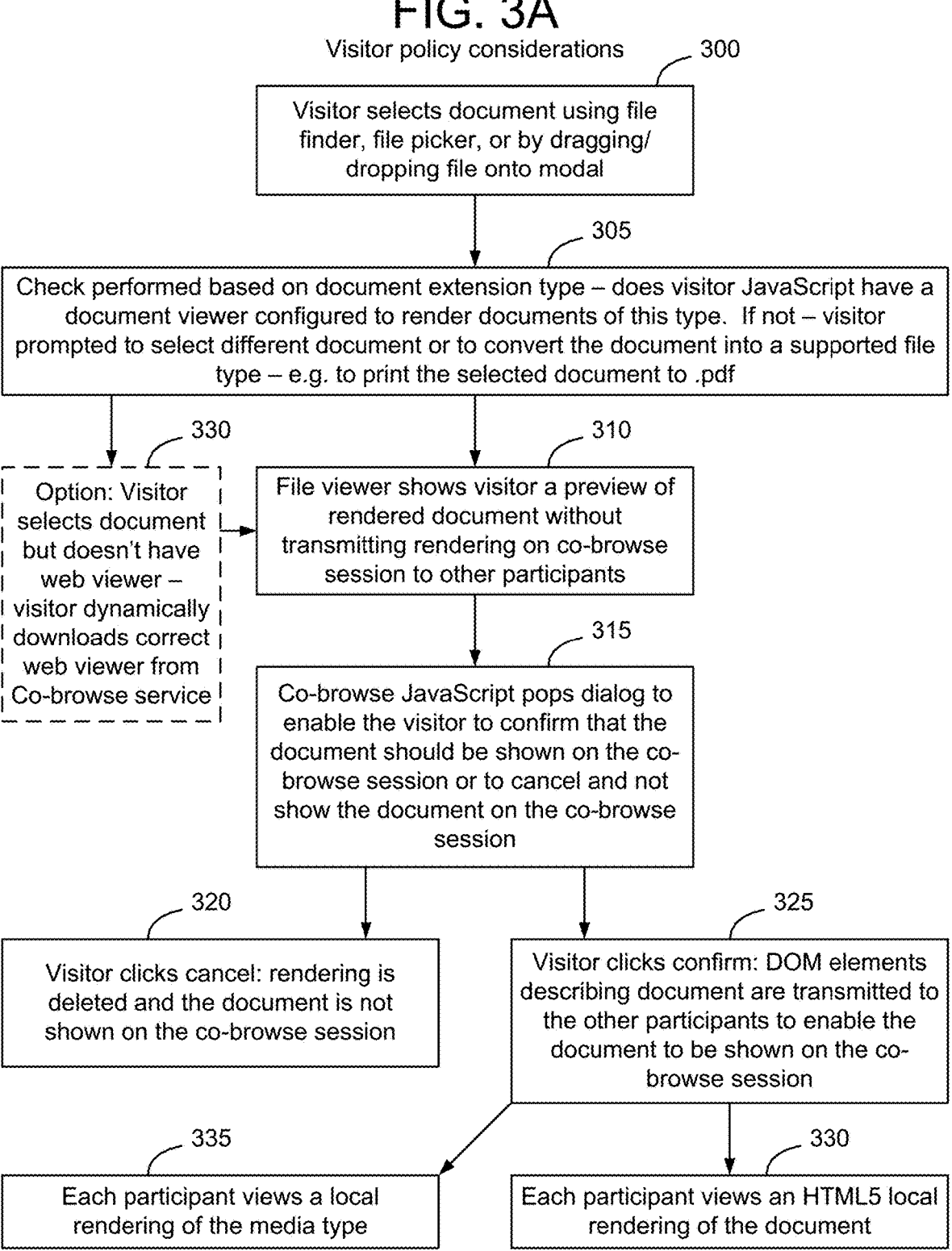

Visitor policy considerations    _ 300

Visitor selects document using file finder, file picker, or by dragging/ dropping file onto modal

_ 305

Check performed based on document extension type – does visitor JavaScript have a document viewer configured to render documents of this type. If not – visitor prompted to select different document or to convert the document into a supported file type – e.g. to print the selected document to .pdf

_ 330

Option: Visitor selects document but doesn't have web viewer – visitor dynamically downloads correct web viewer from Co-browse service

_ 310

File viewer shows visitor a preview of rendered document without transmitting rendering on co-browse session to other participants

_ 315

Co-browse JavaScript pops dialog to enable the visitor to confirm that the document should be shown on the co-browse session or to cancel and not show the document on the co-browse session

_ 320

Visitor clicks cancel: rendering is deleted and the document is not shown on the co-browse session

_ 325

Visitor clicks confirm: DOM elements describing document are transmitted to the other participants to enable the document to be shown on the co-browse session

_ 335

Each participant views a local rendering of the media type

_ 330

Each participant views an HTML5 local rendering of the document

Visitor GUI

Agent selects file to be shown on co-browse session

FIG. 5

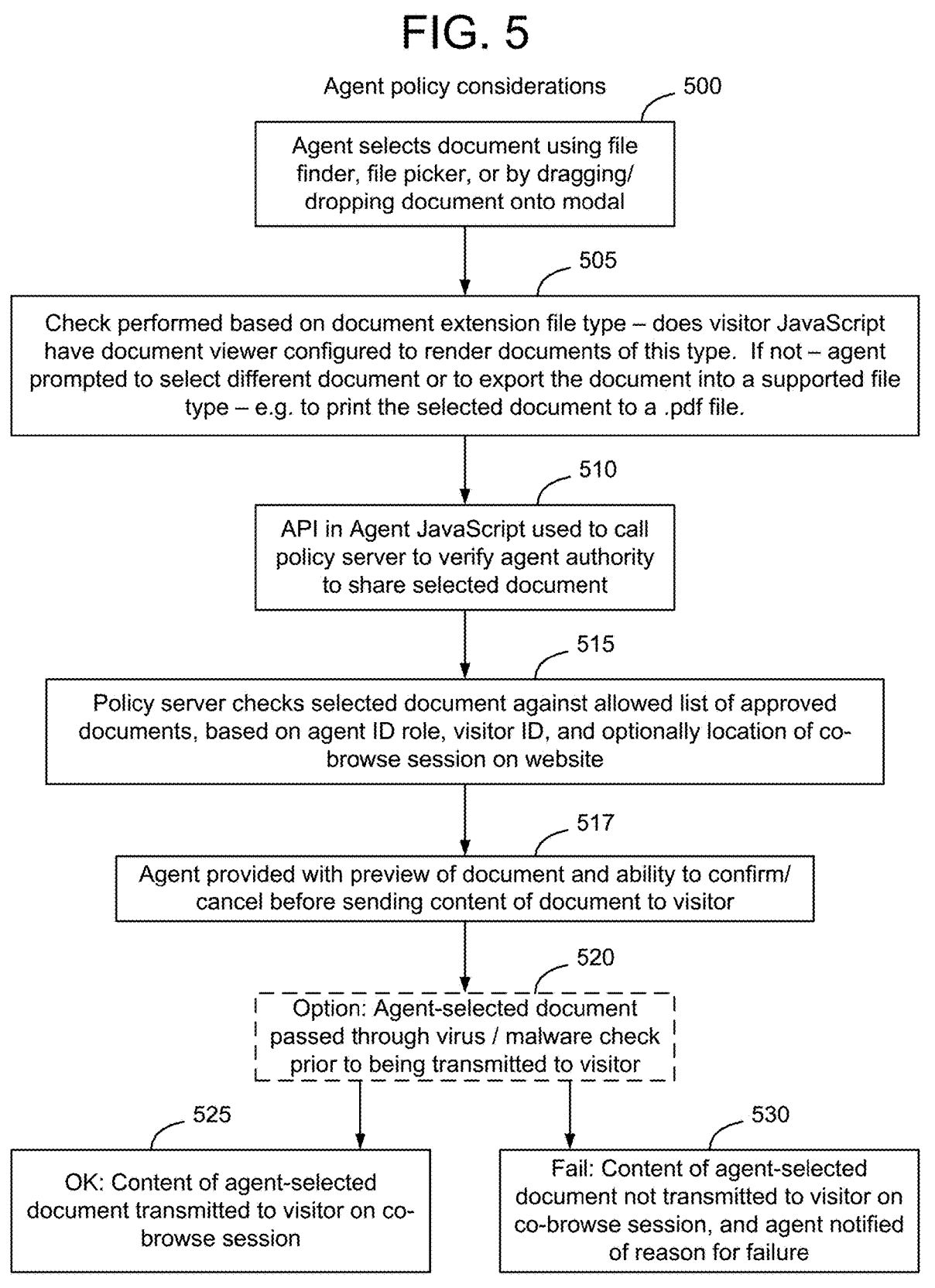

Agent policy considerations    — 500

Agent selects document using file finder, file picker, or by dragging/ dropping document onto modal

— 505

Check performed based on document extension file type – does visitor JavaScript have document viewer configured to render documents of this type. If not – agent prompted to select different document or to export the document into a supported file type – e.g. to print the selected document to a .pdf file.

— 510

API in Agent JavaScript used to call policy server to verify agent authority to share selected document

— 515

Policy server checks selected document against allowed list of approved documents, based on agent ID role, visitor ID, and optionally location of co-browse session on website

— 517

Agent provided with preview of document and ability to confirm/ cancel before sending content of document to visitor

— 520

Option: Agent-selected document passed through virus / malware check prior to being transmitted to visitor

— 525

OK: Content of agent-selected document transmitted to visitor on co-browse session

— 530

Fail: Content of agent-selected document not transmitted to visitor on co-browse session, and agent notified of reason for failure Agent instructs visitor to select document to
be added to a co-browse session Agent view – initiate document sharing – Agent to instruct visitor to select document Visitor and Agent view -- initiate document sharing -- visitor to select document Agent view – initiate document sharing – agent to select document

FIG. 6E

Visitor and agent view – after document has been added as overlay to Visitor Browser          665

Guest Admission process

FIG. 7B

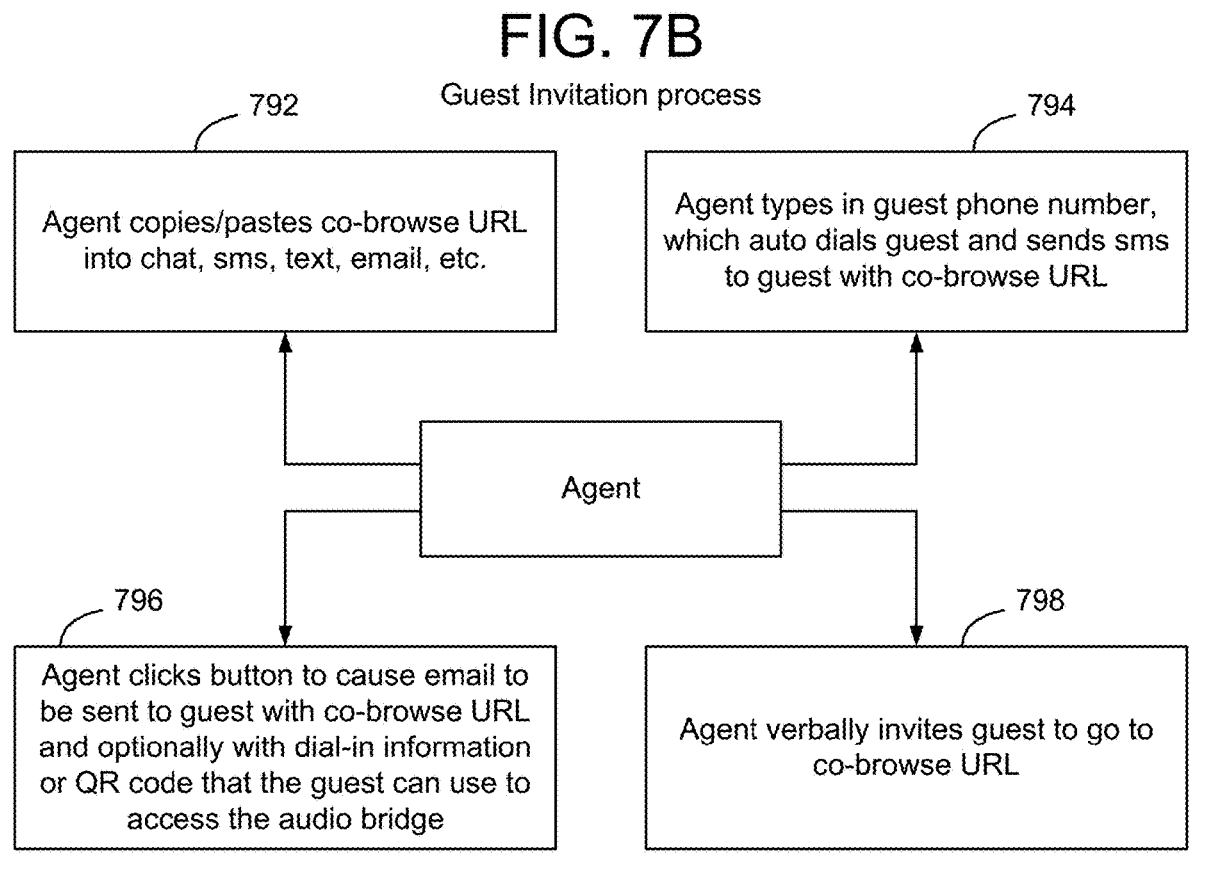

Guest Invitation process

792

Agent copies/pastes co-browse URL into chat, sms, text, email, etc.

794

Agent types in guest phone number, which auto dials guest and sends sms to guest with co-browse URL Agent

796

Agent clicks button to cause email to be sent to guest with co-browse URL and optionally with dial-in information or QR code that the guest can use to access the audio bridge

798

Agent verbally invites guest to go to co-browse URL

FIG. 8

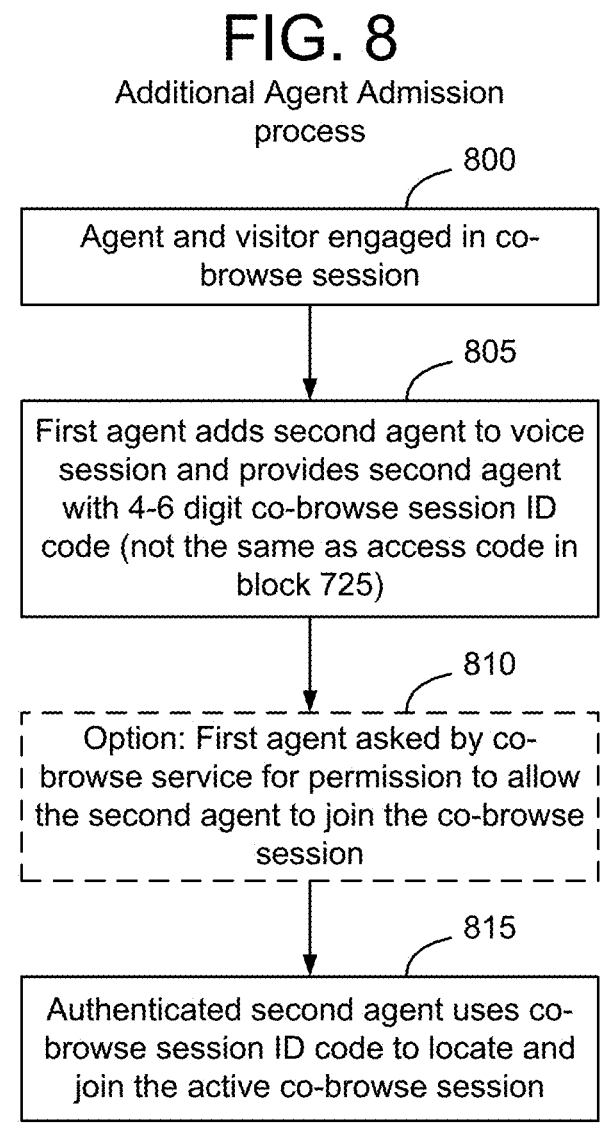

Additional Agent Admission
process

_ 800

Agent and visitor engaged in co-
browse session

_ 805

First agent adds second agent to voice
session and provides second agent
with 4-6 digit co-browse session ID
code (not the same as access code in
block 725)

_ 810

Option: First agent asked by co-
browse service for permission to allow
the second agent to join the co-browse
session

_ 815

Authenticated second agent uses co-
browse session ID code to locate and
join the active co-browse session

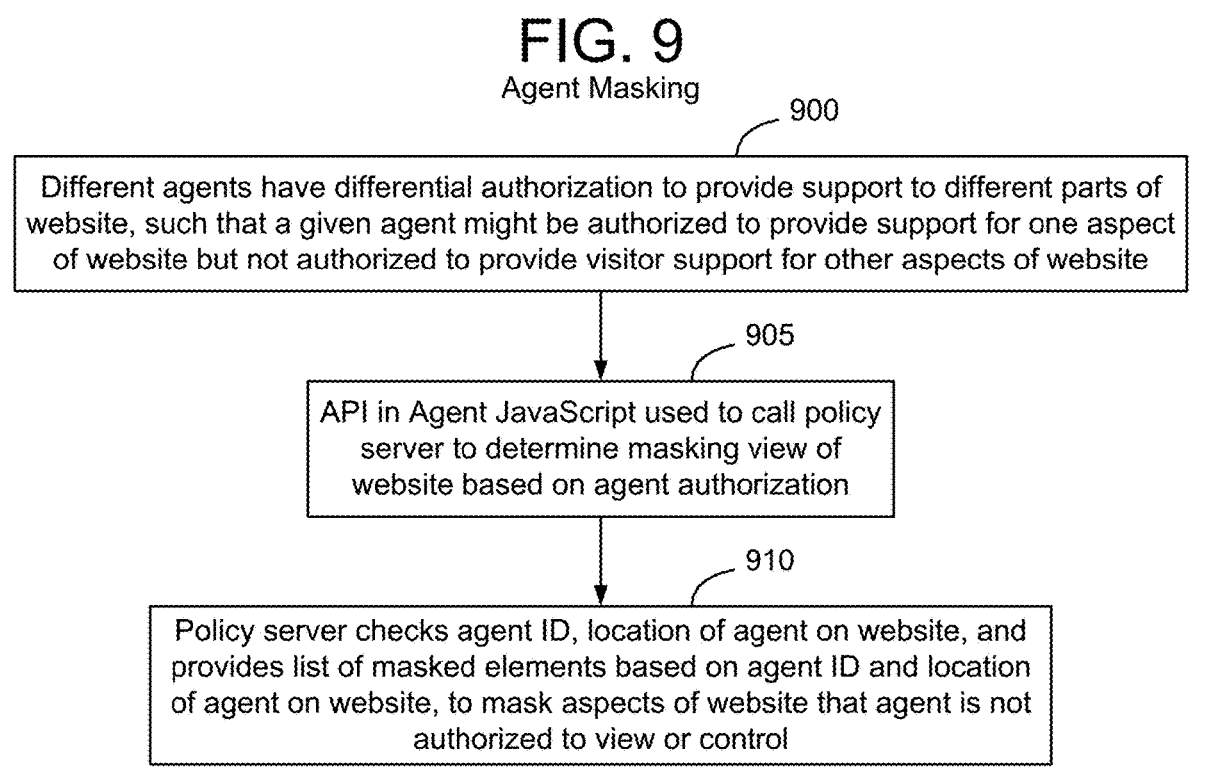

FIG. 9
Agent Masking

900

Different agents have differential authorization to provide support to different parts of website, such that a given agent might be authorized to provide support for one aspect of website but not authorized to provide visitor support for other aspects of website

905

API in Agent JavaScript used to call policy server to determine masking view of website based on agent authorization

910

Policy server checks agent ID, location of agent on website, and provides list of masked elements based on agent ID and location of agent on website, to mask aspects of website that agent is not authorized to view or control

FIG. 10A
Video

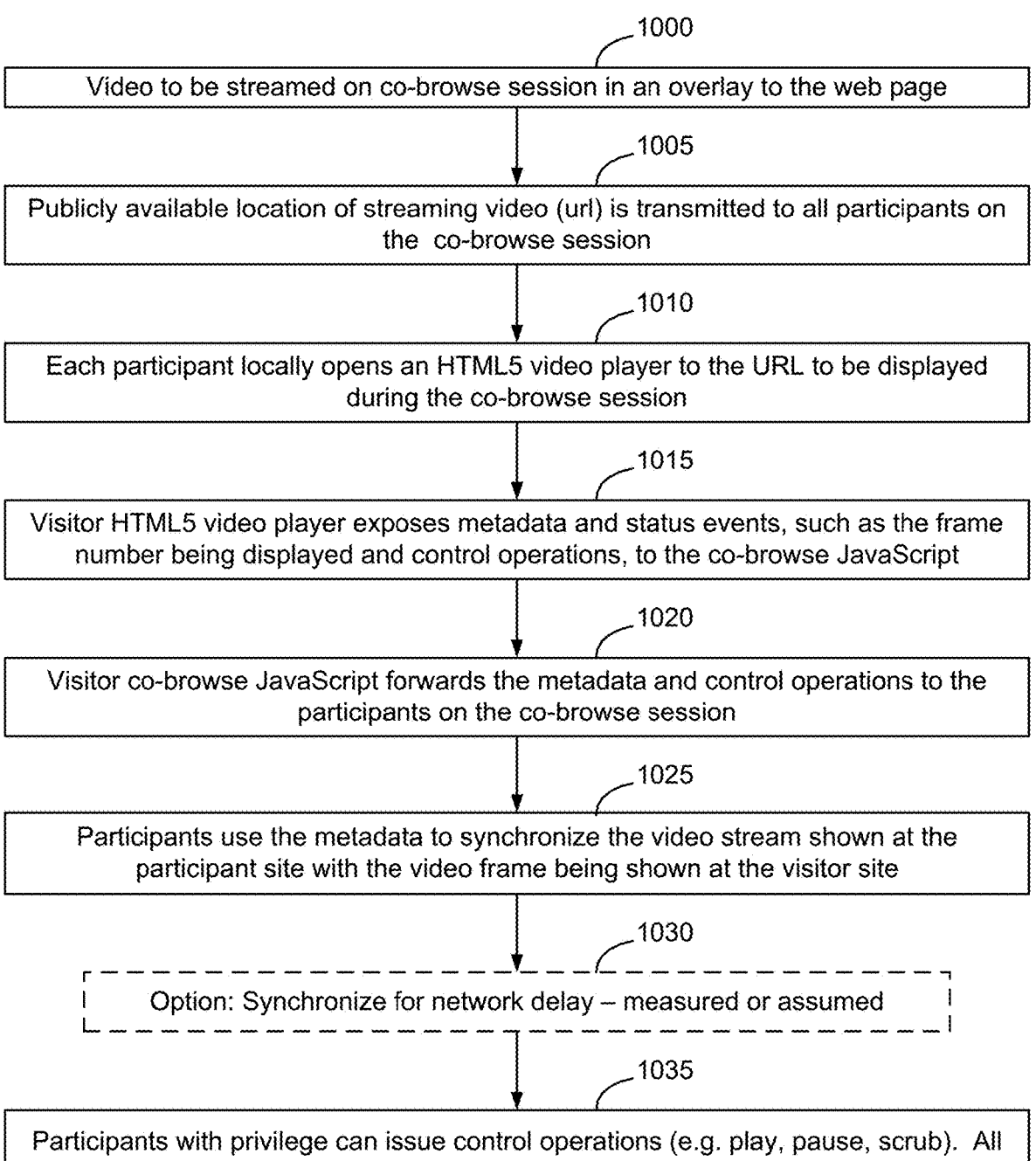

1000

Video to be streamed on co-browse session in an overlay to the web page

1005

Publicly available location of streaming video (url) is transmitted to all participants on the  co-browse session

1010

Each participant locally opens an HTML5 video player to the URL to be displayed during the co-browse session

1015

Visitor HTML5 video player exposes metadata and status events, such as the frame number being displayed and control operations, to the co-browse JavaScript

1020

Visitor co-browse JavaScript forwards the metadata and control operations to the participants on the co-browse session

1025

Participants use the metadata to synchronize the video stream shown at the participant site with the video frame being shown at the visitor site

1030

Option: Synchronize for network delay – measured or assumed

1035

Participants with privilege can issue control operations (e.g. play, pause, scrub).  All control operations are implemented locally and the new metadata (e.g. frame ID) is forwarded to all other participants on co-browse session to keep all participants' views of the streaming video synchronized

FIG. 10B
Latency

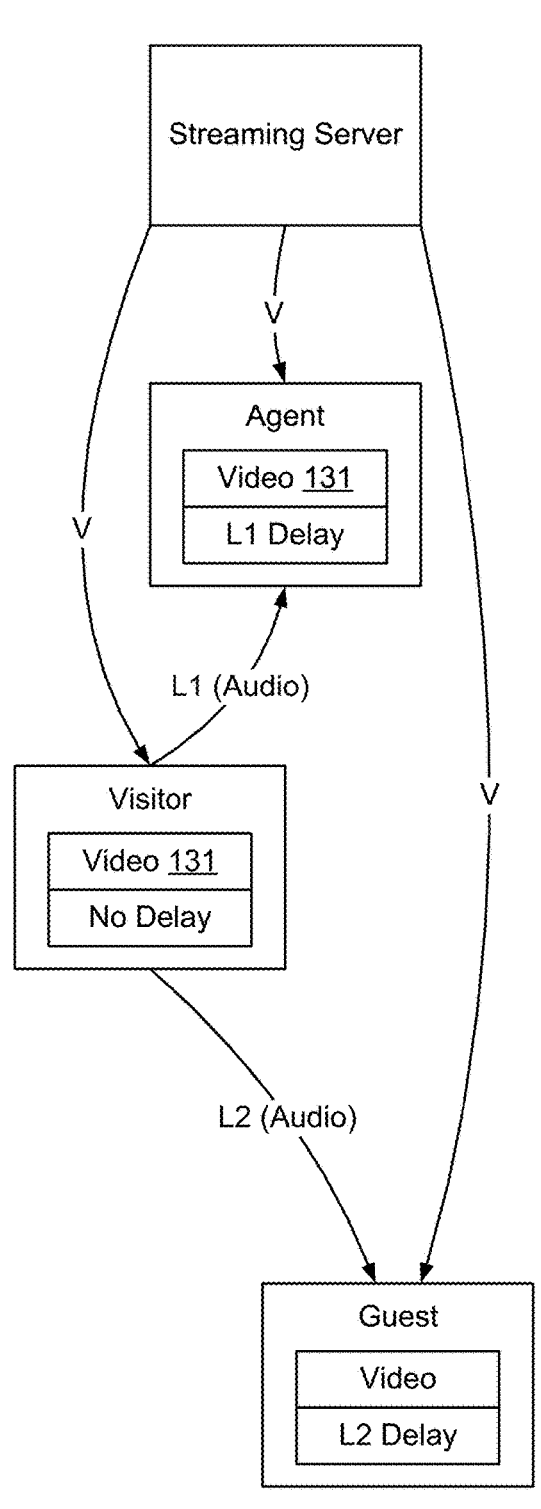

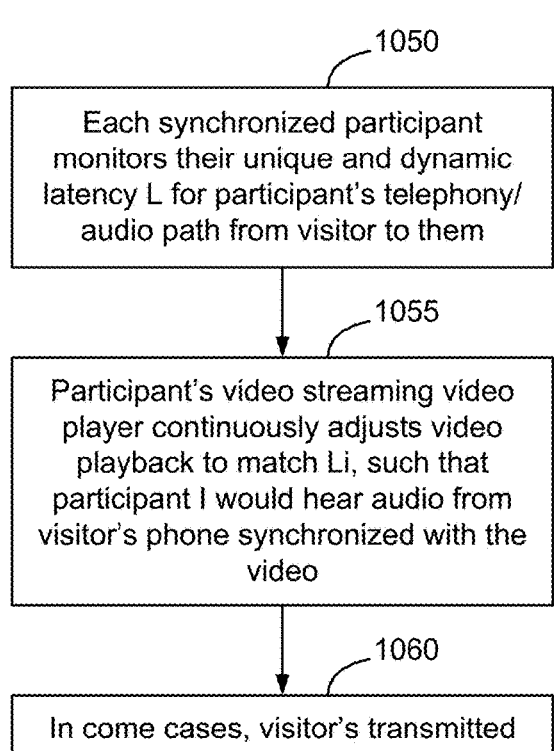

1050

Each synchronized participant monitors their unique and dynamic latency L for participant's telephony/audio path from visitor to them

1055

Participant's video streaming video player continuously adjusts video playback to match Li, such that participant I would hear audio from visitor's phone synchronized with the video

1060

In come cases, visitor's transmitted audio will have little sound from the streamed video. But if it does, participant I may chose to listen to that audio from the phone rather than play the audio locally Participant Video – Large video Agent Local Preview Visitor/Guest Preview Agent View Visitor/Guest View Participant Video – Small Video Agent View                         Visitor/Guest View Participant Video – Video minimized Agent View Visitor/Guest View

FIG. 14

Visitor side – start video

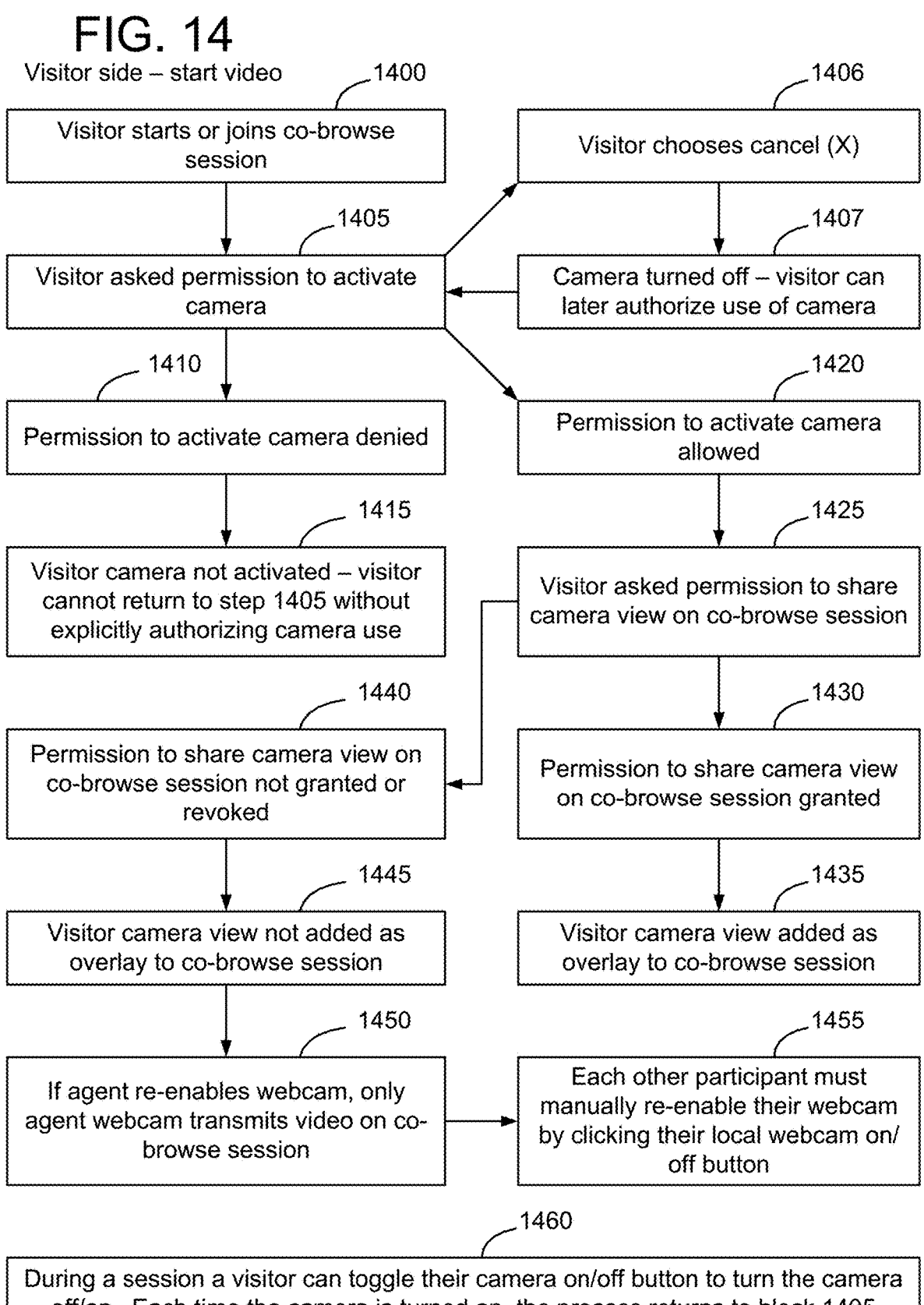

1400
Visitor starts or joins co-browse session

1406
Visitor chooses cancel (X)

1405
Visitor asked permission to activate camera

1407
Camera turned off – visitor can later authorize use of camera

1410
Permission to activate camera denied

1420
Permission to activate camera allowed

1415
Visitor camera not activated – visitor cannot return to step 1405 without explicitly authorizing camera use

1425
Visitor asked permission to share camera view on co-browse session

1440
Permission to share camera view on co-browse session not granted or revoked

1430
Permission to share camera view on co-browse session granted

1445
Visitor camera view not added as overlay to co-browse session

1435
Visitor camera view added as overlay to co-browse session

1450
If agent re-enables webcam, only agent webcam transmits video on co-browse session

1455
Each other participant must manually re-enable their webcam by clicking their local webcam on/off button

1460
During a session a visitor can toggle their camera on/off button to turn the camera off/on. Each time the camera is turned on, the process returns to block 1405

METHOD AND APPARATUS FOR SECURELY CO-BROWSING DOCUMENTS AND MEDIA URLS

CROSS REFERENCE TO RELATED APPLICATIONS

This application is a divisional application of U.S. patent application Ser. No. 17/682,231, filed Feb. 28, 2022, which claims priority to U.S. Provisional Patent Application No. 63/154,757, filed Feb. 28, 2021, entitled Method and Apparatus for Securely Co-Browsing Documents and Media URLs, the content of each of which is hereby incorporated herein by reference.

COPYRIGHT NOTICE

FIELD

The field relates to communication sessions and, more particularly, to a method and apparatus for securely co-browsing documents and media URLs.

DESCRIPTION OF THE RELATED ART

It is possible for the content of a first browser to be shared and reproduced in a second browser at a geographically remote location. One way to do this is to cause the Document Object Model (DOM) describing the content of the first browser to be forwarded to the second browser. The second browser uses the DOM received from the first browser to recreate the content of the first browser. Implementing DOM sharing between a pair of computers is referred to herein as co-browsing. At times it would be advantageous to enable participants to a co-browse session to share documents and media URLs. Unfortunately, securely sharing documents conventionally has been required to be implemented external from the co-browse session, for example by using email or file transfer mechanisms, or using screen share technology to share images of the documents. Additionally, since the scrub position of a rendered video element on a web page can be highly dependent upon how the visitor navigates the page, simply playing the same video element on the agent side can result in an unsynchronized visual experience between the two participants. To avoid confusion, the agent side of a co-browse session may choose not to render video elements on the co-browsed web page. Accordingly, it would be advantageous to provide a method and apparatus for securely sharing documents and media URLs on a co-browse session.

SUMMARY

The Summary and Abstract sections are provided herein to introduce some concepts discussed in the Detailed Description below. The Summary and Abstract sections are not comprehensive and are not intended to delineate the scope of protectable subject matter, which is set forth by the Claims presented below.

All examples and features mentioned below can be combined in any technically possible way.

Secure sharing of a document on a co-browse session is implemented by causing a JavaScript implemented viewer to create HTML5 description of a rendered view of a document from the content of a document, and transmitting the HTML5 description of the rendered view of the document content as a DOM elements on the co-browse session. The rendered view of the document is overlayed on the web page being co-browsed in a modal, which enables the participants to the co-browse session to collaboratively view the rendered view of the content of the document. However, since the document itself only resides in the visitor's browser, the document itself never is stored on the co-browse service, on the agent computer, or on any other participant's computer. Any participant to a co-browse session may share a document, by causing the content of the document to be forwarded on the co-browse session to the visitor, where the content of the document is rendered into HTML5 which then becomes part of the DOM that is shared on the co-browse session. Multiple types of documents may be viewed, including documents with .xls, .pdf, .docx, and .ppt extensions, although this list is not exhaustive. JavaScript based applications running within the visitor's browser can also be shared in this manner. Media URLs can also be shared, either selected by one of the participants to the co-browse session, or embedded in the website, and the participants' views of the audio/video media is synchronized by causing the video to play locally at each participant but synchronized with the visitor. Live video of all of the participants to the co-browse session, can also be implemented.

In one aspect, a method of securely co-browsing documents on a co-browse session including establishing a co-browse session in which a DOM describing content of a first browser and changes to the DOM describing changes to the content of the first browser are shared with a second browser, to enable the second browser to recreate the content of the first browser and have a consistent view of the content of the first browser. The method includes selecting a document to be included on the co-browse session, and rendering a view of the document to create a HTML description containing HTML objects that are rendered onto an overlay on the first browser. The method includes incorporating the HTML objects of the document into the DOM describing the content of the first browser, and forwarding the HTML objects as part of the DOM from the first browser to the second browser on the co-browse session.

In some implementations, the method also includes storing the HTML description of the rendered view of the file document in browser RAM at the first browser and, when the co-browse session ends, automatically deleting the HTML objects by the first browser.

In certain implementations, the rendered view of the document includes only a visible portion of the document.

In some implementations, the method also includes receiving the HTML objects by a co-browse service implementing the co-browse session intermediate the first browser and second browser, and forwarding the HTML objects from the first browser to the second browser without storing a copy of the HTML objects at the co-browse service.

In certain implementations, the method also includes encrypting the HTML objects, by the first browser, before transmitting the HTML objects on the co-browse session.

In some implementations, the step of selecting a document further includes determining a file type of the selected document; and determining if the first browser has a document viewer configured to render documents with that file type into the HTML objects. In some implementations, the document type is one of a .docx document, a .pdf document, an .xls spreadsheet, and a slide presentation.

In certain embodiments, when the first browser does not have a document viewer configured to render documents of the file type into the HTML objects, the method further includes prompting the visitor to convert the selected document to a second file type. In other embodiments, the method may also include automatically converting the selected document to a second file type. In other embodiments, the method further includes automatically downloading a document viewer for the selected document type.

In some implementations, the method also includes generating a local preview on the first browser prior to incorporating the HTML objects of the document into the DOM describing the content of the first browser and prior to forwarding the HTML objects as part of DOM from the first browser to the second browser on the co-browse session.

In certain implementations, the method also includes presenting a dialog in connection with the local preview on the first browser, and only incorporating the HTML objects of the document into the DOM describing the content of the first browser and prior to forwarding the HTML objects as part of DOM from the first browser to the second browser on the co-browse session if inclusion of the HTML objects into the DOM is authorized via the dialog. In some embodiments, the method also includes deleting the HTML objects of the document and not incorporating the HTML objects of the document into the DOM if not authorized via the dialog.

In some implementations, the content of the first browser includes a web page, and the HTML objects describing the document are overlaid in a modal on top of the web page shown on the first browser and on the second browser.

In certain implementations, selecting a document to be included on the co-browse session comprises selecting a document resident on a computer hosting the first browser.

In some implementations, selecting a document to be included on the co-browse session comprises selecting a document resident on a second computer hosting the second browser, transmitting the content of the document from the second computer hosting the second browser to a first computer hosting the first browser, and using the content of the document to render the document into the HTML objects at the first browser.

In certain implementations, the method also includes storing a copy of the selected document on the first computer hosting the first browser.

In some implementations, the method also includes determining a file type of the selected document by the second browser, and only allowing selection of the document for inclusion on the co-browse session by the second browser when the first browser has a document viewer configured to render documents of the file type.

In certain implementations, the method also includes comparing the selected document against an allowed list of approved files at the second browser, and only allowing selection of the document for inclusion on the co-browse session by the second browser when the selected document is on the list of approved files.

In some implementations, the method also includes performing a virus or malware scan of the document at the second computer prior to transmitting the content of the document from the second computer hosting the second browser to the first computer hosting the first browser.

In another aspect, a method of incorporating streaming video on a co-browse session includes establishing a co-browse session in which a DOM describing content of a first browser and changes to the DOM describing changes to the content of the first browser are shared with a second browser, to enable the second browser to recreate the content of the first browser and have a consistent view of the content of the first browser. The method includes sharing a URL of a publicly available location of a media resource on the co-browse session, the media resource providing the source of the streaming video, retrieving the media resource from the publicly available location and locally playing the media resource in the first browser, and retrieving the media resource from the publicly available location and locally playing the media resource in the second browser. The method also includes collecting streaming video metadata and streaming video control information associated with playing the media resource at the first browser, transmitting the streaming video metadata and streaming video control information on the co-browse session from the first browser to the second browser on the co-browse session, and using the streaming video metadata and control information, by the second browser, to synchronize local playing of the media resource on the second browser with playing of the media resource on the first browser.

In some implementations, the method also includes synchronizing an external audio source with the streaming video by detecting latency of each of the participants, and locally adjusting the external audio source based on the detected latency.

In certain implementations, the streaming video metadata includes a frame number being displayed.

In some implementations, streaming video control information includes control operations including play, pause, and scrub operations.

In certain implementations, the method also includes compensating for transmission delay associated with transmission of the streaming video metadata and streaming video control operations from the first browser to the second browser on the co-browse session.

In some implementations, compensating for transmission delay comprises measuring a first network delay value between the first browser and a co-browse service implementing the co-browse session intermediate the first browser and second browser, measuring a second network delay value between the co-browse service and the second browser, and using the measured first and second delay values to adjust the streaming video metadata used by the second browser to determine a frame number of the streaming video to be displayed at the second browser.

In certain implementations, the method also includes entering an a streaming video control operation by the second browser, locally applying the streaming video control operation to the locally playing media resource in the second browser, forwarding the streaming video control operation from the second browser to the first browser on the co-browse session, and implementing the streaming video control operation on the locally playing media resource in the first browser.

In another aspect, a method of securely admitting an unauthenticated guest to a co-browse session includes establishing a co-browse session in which a DOM describing content of a first browser and changes to the DOM describing changes to the content of the first browser are shared with a second browser, to enable the second browser to recreate the content of the first browser and have a consistent view of the content of the first browser, the second browser being associated with an entity that has been authenticated to a co-browse service implementing the co-browse session intermediate the first browser and second browser. The method includes initiating a manual process of admitting a guest browser to join the co-browse session by one of the participants to the co-browse session, loading a guest access web page by the guest browser, the guest access web page including a first input field for entry of the guest's name, entering the guest name into the first input field of the guest access web page, and displaying a guest access code on the guest access web page in the guest browser. The method also includes, in response to receiving the guest access code from the guest, entering the access code into a co-browse control on the second browser associated with the entity that has been authenticated to the co-browse service, and when the access code entered into the co-browse control matches the access code displayed on the guest access web page, including the guest in the co-browse session.

In some implementations, including the guest in the co-browse session comprises redirecting the guest access web page to a page on a co-browse service domain, along with a one-time time-sensitive token generated by the co-browse service that authenticates the guest to join the co-browse session.

In certain implementations, the second browser includes a page on the co-browse service domain, and wherein the guest access web page is on the co-browse service domain.

In some implementations, the method also includes communicating a URL of the guest access web page from the second browser to the guest.

In another aspect, a method of providing a visitor with a dynamically changing customized list of masked elements, based on a location of a visitor on a website and based on an agent's ability to provide customer service for particular aspects of the website includes establishing a co-browse session in which a DOM describing content of a visitor's browser and changes to the DOM describing changes to the content of the visitor's browser are shared with an agent browser, to enable the agent browser to recreate the content of the visitor's browser and have a consistent view of the content of the visitor's browser. The method includes determining a visitor's location on a website shown in the visitor's browser, determining an agent's role, determining an agent's privilege, and based on the agent's role and privilege, generating a dynamic list of masking rules of the website, the masking rules specifying which objects of the website should be visible to the visitor and not visible to the agent, such that the masked objects are included in the agent view of the website, but the content of the masked objects is not included in the agent view of the website on the co-browse session.

In another aspect, a method of including live video of participants to a co-browse session on the co-browse session includes establishing a co-browse session in which a DOM describing content of a first browser and changes to the DOM describing changes to the content of the first browser are shared with a second browser, to enable the second browser to recreate the content of the first browser and have a consistent view of the content of the first browser. The method includes obtaining a first live video stream of a first participant using the first browser, obtaining a second live video stream of a second participant using the second browser, and incorporating the first live video stream and the second live video stream in the co-browse session such that both the first live video stream and the second live video stream are displayed in both the first browser and in the second browser. The method also includes selecting a live video viewing mode of the first and second live video streams, at the first browser, transmitting an indication of the selected live video viewing mode from the first browser to the second browser on the co-browse session, and using the indication of the selected live video viewing mode to enforce an identical live video viewing mode to be implemented at the second browser.

In some implementations, a first of the live video viewing modes is a large format live video viewing mode, in which the first live video stream and the second live video stream is shown in an overlay to a webpage being shown on the co-browse session, and the webpage is partially grayed out.

In certain implementations, a second of the live video viewing modes is a small format live video viewing mode, in which the first live video stream and the second live video stream is reduced in size when compared with the large format participant video mode, the first live video stream and the second live video stream is shown in an overlay to the webpage being shown in the co-browse session, and the webpage is not partially grayed out to enable the first live video stream and the second live video stream to be viewed while interacting with the webpage.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 3A is a flow chart of example policy checks that may be implemented in connection with enabling a visitor to choose a document or media URL to be shown on a co-browse session, according to some embodiments.

FIG. 5 is a flow chart of example policy checks that may be implemented in connection with enabling an agent to choose a document or media URL to be shown on a co-browse session, according to some embodiments.

FIG. 6E is an example screen shot showing an example document that has been rendered into HTML5 by a visitor browser, and the HTML5 description of the rendered view of the file contents transmitted as part of the DOM on the co-browse session, according to some embodiments. Both visitor and agent browsers will display this same view of the document.

FIG. 7B is a block diagram showing a collection of example ways that an agent might use to invite a guest to connect to a co-browse session, according to some embodiments.

FIG. 8 is a flow chart of a method of an example secure admission process designed to enable an additional agent, that is authenticated to the co-browse service, to join an existing co-browse session, according to some embodiments.

FIG. 9 is a flow chart of a method of masking an agent's view of a website based on agent authorization parameters, according to some embodiments.

FIG. 10A is a flow chart of an example method of synchronizing streaming video between participants of a co-browse session, according to some embodiments. The media URL of the streaming video may be selected by one of the participants and added to the co-browse session or may be an embedded element in the webpage being actively co-browsed by the participants.

FIG. 10B is a diagram illustrating one way of detecting and compensating for audio latency in connection with synchronizing video between participants to a co-browse session, according to some embodiments.

FIG. 14 is a flow chart of an example method of obtaining permission from a visitor to initiate visitor-side participant video on a co-browse session, according to some embodiments.

DETAILED DESCRIPTION

The following detailed description sets forth numerous specific details to provide a thorough understanding of some embodiments of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
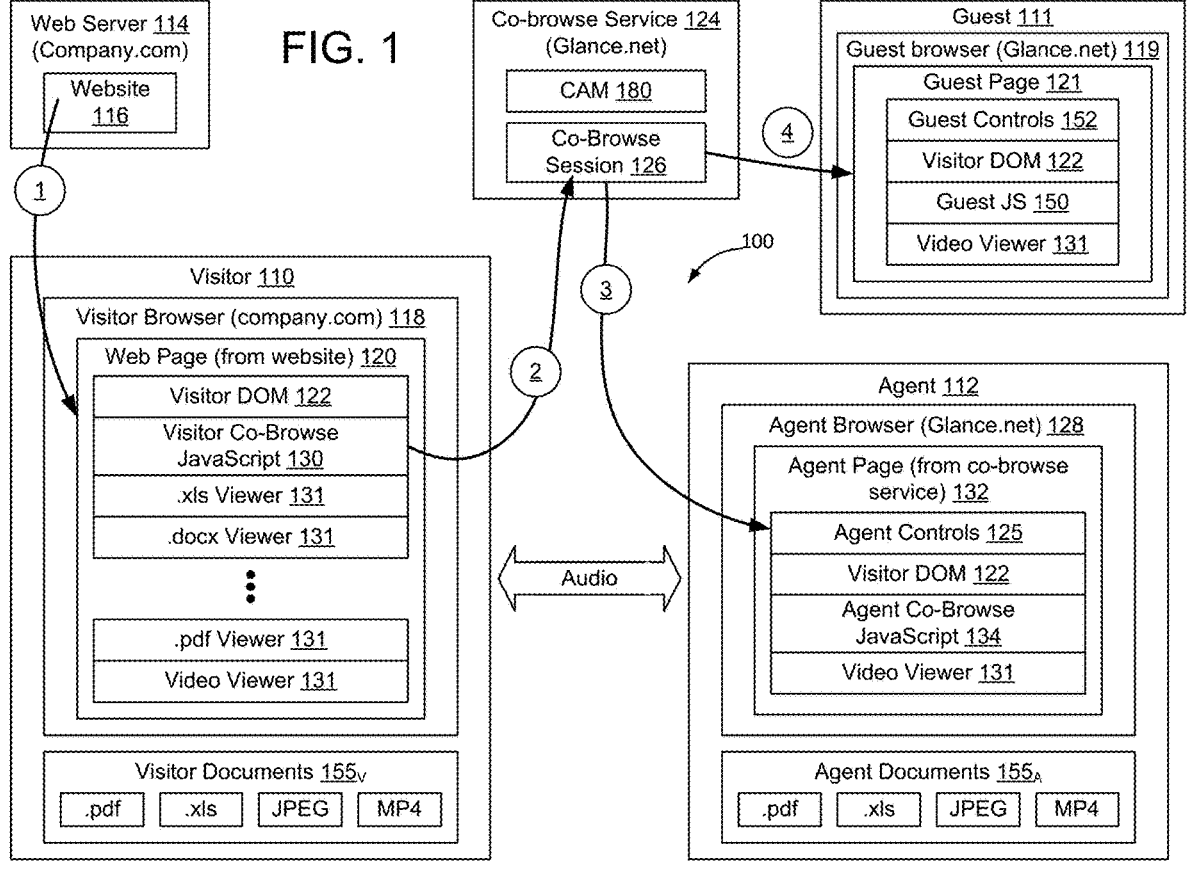
FIG. 1 is a functional block diagram of a network of components enabling secure sharing of documents and media URLs between participants on a co-browse session, according to some embodiments.

FIG. 1 is a functional block diagram of a network of components enabling secure sharing of documents and media URLs between participants on a co-browse session, according to some embodiments. As used herein, the term "visitor" refers to a customer whose web session is being co-browsed. The visitor loads a web page to a browser, and the content of the visitor's browser is the source of content on the co-browse session via a co-browse system. In some embodiments, multiple visitors can join a co-browse session.

The term "agent" is used herein to refer to a person that has been authenticated to the co-browse system and is authorized by the co-browse system to receive content from visitors on co-browse sessions. Multiple agents can join a co-browse session.

The term "guest" is used herein to refer to a person who is not authenticated to the co-browse system, but is admitted in a secure fashion to a co-browse session and allowed to receive content from the visitor on the co-browse session. In some embodiments, guests are manually admitted to co-browse sessions by agents. Multiple guests can join a co-browse session.

The term "participant" is used herein to refer to all persons on a co-browse session. The term "participant" thus collectively refers to the visitor, the one or more agents, and to any guests that join a co-browse session.

Throughout this description the terms "visitor", "agent", "guest", and "participant" will be used to refer to the computers or mobile devices used to connect to a co-browse session 126.

As shown in FIG. 1, in some embodiments a web server 114 hosts website 116. A visitor 110 accesses website 116 using visitor browser 118 to load a web page 120 from the web server 114 (arrow 1). The web page 120 is described by visitor DOM 122.

A co-browse service 124 facilitates a co-browse session 126 on which the agent 112 is able to view the content of the visitor browser 118 in agent browser 128 (arrows 2 and 3). Similarly, a guest 111 may be admitted to the co-browse session 126 and view the content of the visitor browser 118 in guest browser 119 (arrow 4).

In some embodiments, the web page 120 loaded by visitor browser 118 from web server 114 is scripted with co-browse JavaScript 130. Alternatively, the co-browse JavaScript 130 may be loaded to visitor browser 118 from the co-browse service 124. If a co-browse session 126 is established, co-browse JavaScript 130 captures the Document Object Model (visitor DOM 122) from visitor browser 118, and forwards the visitor DOM 122 to the co-browse service 124 on the co-browse session 126 (arrow 2). The visitor DOM is an object-oriented representation of the web page 120 loaded by the visitor browser 118, which can be modified with a scripting language in the web page, such as JavaScript. For example, as discussed in greater detail below, JavaScript can be used in the visitor browser 120 to render the content of one or more documents using HTML5. Rendering a document in HTML in visitor browser 120 during a co-browse session makes an identical view of the document appear on the agent browser 128 and guest browsers 119.

The co-browse service 124 provides the agent 112 with an agent page 132 that is loaded to agent browser 128 (arrow 3). Agent page 132, in some embodiments, includes agent controls 125 that the agent can use to control the agent's participation on the co-browse session 126, agent co-browse JavaScript 134, and video viewer 131. If a guest is on the session 126, the co-browse service 124 provides the guest browser 119 with a guest page 121 that is loaded to the guest browser 119 (arrow 4). In some embodiments, the guest page 121 has a set of guest controls 152 that may have limited functionality, limiting the guest's ability to actively participate on the co-browse session 126. The guest page 121 also includes guest JavaScript 150, video viewer 131, and a copy of the visitor DOM 122 that is updated on the co-browse session and enables the content of the visitor browser to be recreated in the guest browser 119. The following description will primarily focus on the manner in which the visitor and agent interact on the co-browse session.

The agent page 132 includes the visitor DOM 122 and agent co-browse JavaScript 134. As changes occur to the visitor DOM 122 on the visitor 110, those changes are captured by the visitor co-browse JavaScript 130 and sent by the visitor 110 to the co-browse service 124 on the co-browse session 126 to be relayed to the agent 112 and other participants. In this manner, co-browse service 124 facilitates transmission of the visitor DOM 122 and changes to the visitor DOM 122 to the agent browser 128 and other participants on co-browse session 126, to enable the agent browser 128 and other participants to have a consistent view of the content of the visitor's browser 118. Additional details of how an example co-browse system of this nature may be implemented are provided in U.S. Pat. No. 9,736,214, entitled INTEGRATING CO-BROWSING WITH OTHER FORMS OF INFORMATION SHARING, the content of which is hereby incorporated herein by reference.

As shown in FIG. 1, in some embodiments, the visitor browser 118 includes video viewer 131 configured to play a media source from a publicly visible URL, using the browser's (software or hardware-accelerated) video viewer 131. In some embodiments, a participant with sufficient privilege can select a media file from their local device or a publicly visible webserver, and add its real-time playback to the co-browse experience. Visitor co-browse JavaScript 130, in some embodiments, monitors metadata, events and state of the video player 131, and transfers the event and state information (video metadata) on the co-browse session 126 to synchronize display of streaming video on all participants. The other participants retrieve the same video from the publicly accessible video source and use the metadata to synchronize their views of the video with the visitor's view of the video. Additional details associated with video sharing on the co-browse session are described below in connection with FIGS. 10A and 10B.

The visitor co-browse JavaScript 130 also includes one or more viewers 131, each of which is configured to read a particular file format and render documents of that file format into HTML5. In FIG. 1 the example viewers 131 include a viewer for .xls files (Excel files), a viewer for .docx (Word files), a viewer for .pdf (Adobe Acrobat files) and a video viewer. Although only four viewers are shown, the visitor co-browse JavaScript may include multiple viewers for various document or media types.

In some embodiments, when a visitor selects a document 155$_V$ to share, or the agent selects a document 155$_A$ for the visitor to share, the viewer for that particular file format is selected and used by visitor co-browse JavaScript 130 in visitor browser 118 to generate an HTML5 description of the content of the file and renders it as an overlay to web page 120 in the visitor's browser 118. This enables the rendering of the document to be viewed as part of the ongoing co-browse session. The HTML5 elements become part of the visitor's DOM 122, which lets the co-browse session 126 share the same view with all participants. Each other participant to the co-browse session receives the DOM changes and resources needed to display the rendered view of the document as an overlay in their browser.

The original file for the document 155$_V$, 155$_A$, or media file always remains on the visitor computer. Only the rendering of the portion of the file the visitor views is sent to and visible to other participants, and the rendering is sent securely by the co-browse service over web socket secure connections. The rendering is always encrypted in motion and never at rest. In some embodiments, participants in the co-browse session are able to download the shared file from the visitor, if the visitor settings are configured to allow the actual document to be shared. Otherwise, only the HTML5 elements are shared, and the document remains only on the visitor computer.

Competing co-browse services typically upload the original file to a publicly visible server, that renders the document it in a headless browser or other player, and then sends the view to participants using screen sharing or WebRTC or other co-browse technology. Storing shared files on a publicly visible server poses a security risk, because it potentially places Personally Identifiable Information (PII) at rest on a public (often multi-tenant) server. To mitigate this security risk, enterprises using a co-browse service with this type of architecture often resort to installing the document service on a internally managed, but publicly visible servers. This complicates integration, troubleshooting, remote management, and adds complexity to the software update process. It also compromises the scalability, robustness and global reach possible with the proposed architecture, which is able to be deployed in a worldwide network of shared multi-tenant servers.

The document/media sharing architecture in this disclosure is inherently more secure than an architecture which uploads documents to a server, because (1) the document or media file never leaves visitor 110's device, and (2) the file is never stored (at rest) in the co-browse service 124. Additional details about how documents can be shared in this manner is discussed in greater detail below in connection with FIGS. 2-5 and 6A-6E.

If resources (CSS, fonts, icons) required to display the document are only found local to the visitor, the co-browse service's Content Asset Management (CAM) system 180 allows each participant's browser to retrieve those assets from the visitor's browser via the CAM feature in co-browse service 124. For each customer use case, CAM can be restricted to cache only asset types that should never contain Personally Identifiable Information (PII), such as CSS, fonts, and icons. Additional details of how an example co-browse system may implement content asset management are provided in U.S. patent application Ser. No. 16/686,873, filed Nov. 18, 2019, entitled METHOD AND APPARATUS FOR ACCESSING PROPRIETARY RESOURCES ON A CO-BROWSE SESSION, the content of which is hereby incorporated herein by reference.

There are instances where the web page 120 loaded by visitor browser 118 includes rich media as part of the page content. To enable the participants to the co-browse session to have a synchronized view of the rich media content, in some embodiments the co-browse JavaScript 130 will read the metadata/state of the visitor's rendition of the local video element and transmit the metadata/state of the visitor's rendition on the co-browse session. Example metadata and state/event information might include the currentTime (visitor's current playback position), height and width of the media, and many other attributes. Example state/event information might include play, pause, ended, progress, ratechange, seeked, stalled, suspend, volumechange, waiting, and numerous other events. The agent JavaScript 134 uses the metadata/state information about the rich media to locally synchronize the agent's view of the rich media and other participant's views of the rich media with the visitor's view. In this manner all participants locally render the rich media locally, but in a synchronous manner with the visitor, to ensure each participant's view of the media stays synchronized with the visitor's view.

Figure 2:
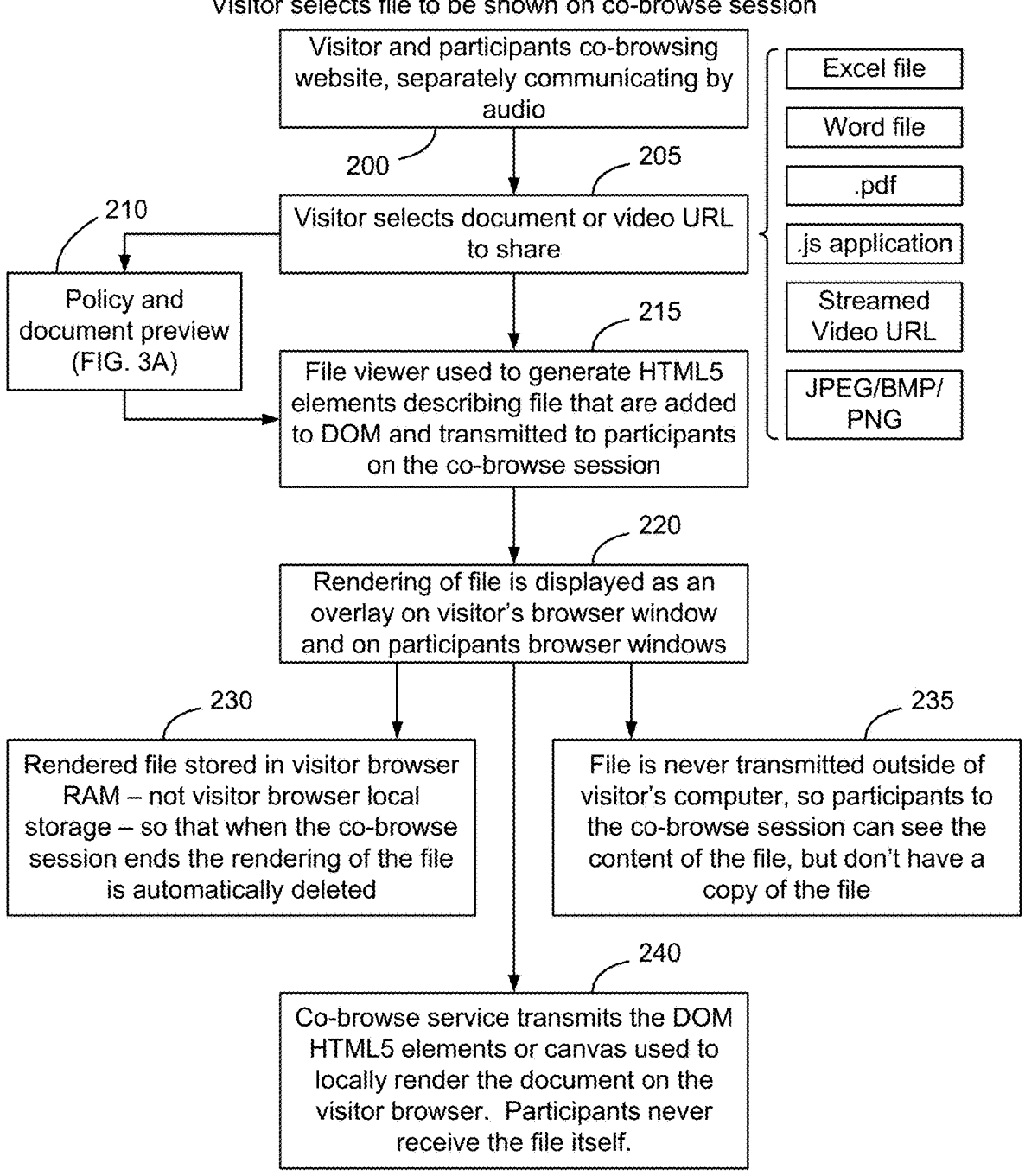
FIG. 2 is a flow chart of a method of selecting a document or media URL to be shown on a co-browse session by a visitor, according to some embodiments.

FIG. 2 is a flow chart of a method of selecting a file to be shown on a co-browse session by a visitor, according to some embodiments. As shown in FIG. 2, in block 200 the visitor and participants are co-browsing a website and are separately communicating by audio. The visitor then selects a document or media file to share (block 205). The document may be an excel file, a word file, a .pdf file, a JavaScript implemented application such as a mortgage calculator, a publicly visible media file, an image such as a JPEG/BMP/PNG file, or numerous other types of content. Optionally, when the visitor selects a file to share, the visitor JavaScript implements one or more policy checks, for example, to show the visitor a preview of the selected document (see FIG. 3A) before the view of its contents is sent to participants on the co-browse session (block 210).

Once a file has been selected and determined to be suitable for sharing, the content of the file is rendered into HTML5 using a viewer 131 specific to the file type. The viewer is implemented using JavaScript in the visitor browser 118 that is downloaded from the co-browse service 124, from the web server 114 in connection with web page 120, or from another trusted source (block 215). The rendering of the file is displayed in an overlay on the visitor's browser window (220). In some embodiments the rendered file is displayed in a modal on top of the web page 120. The HTML5 description of the rendered view of the file contents becomes part of the visitor DOM, and is transmitted from the visitor to the participants on the co-browse session 225.

In some embodiments, the HTML5 description of the rendered view of the file contents is stored in visitor browser RAM, not visitor browser local storage, so that when the co-browse session ends the data used to render the file is automatically released by visitor browser 118 (block 230). The file that the user is showing on the co-browse session 126 is never transmitted outside of the visitor's computer. Rather, the participants to the co-browse session see the rendering of the file as part of the co-browse session, but don't have a copy of the content of the file (block 235). In some embodiments, the viewer renders only the portion of the file that is being viewed by the visitor, such that only the visible portion of the file is rendered and transmitted on the co-browse session. In other embodiments, the viewer renders the entire document into HTML5 and transmits all the HTML5 elements (and via CAM system 180 any local resources needed), sufficient to render the same view to the other participants on the co-browse session.

Additionally, the co-browse service transmits the HTML5 description of the rendered view of the file contents from the visitor to the participants without storing the DOM/HTML5 elements needed to render the view of the file contents (block 240). The DOM updates from the visitor are encrypted in transport, for example using web socket secure, and the DOM elements describing the rendered view of the file content are never at rest on the co-browse servers.

The co-browse service 124 multipoints the HTML description of a rendered view of the file contents to all (authenticated) participants, whose browsers locally render their view of the document or media URL, with perfect resolution and scalability. Accordingly, rather than using a video codec to screen share the content of the selected document, which may have limited resolution and can consume considerable bandwidth within co-browse service 124, the use of a viewer to create an HTML5 description of a rendered view of the file content, which then becomes part of the co-browse session, enables all participants to see a perfectly rendered view of the content of the document on the co-browse session while enabling the document file to remain securely within the visitor's device 110.

In some embodiments, the agent(s), visitor, and optionally guests, can gesture on the viewed document using gesture tools implemented using the visitor, agent, and guest co-browse JavaScript (130, 134, 150). The agent 112 may have the privilege to remotely advance pages and to remotely scroll the document to enable the agent to manage movement through the document remotely on the co-browse session. The gestures may be temporary or permanent, and may include graphical elements such as lines, lassos, typed information, or other forms of gestures. The visitor or any participant having privilege can save the gestures or print the document, depending on the implementation.

FIG. 3A is a flow chart of example policy checks that may be implemented in connection with enabling a visitor to choose a document or media URL to be shown on a co-browse session, according to some embodiments. As shown in FIG. 3A, when a visitor selects a document or media URL 155$_V$ using a file finder, file picker, or by dragging/dropping the file onto a modal associated with the co-browse session (block 300), the visitor co-browse JavaScript 130 may perform particular actions to ensure that the visitor has selected an allowed file type. For example, as shown in FIG. 3A, the visitor co-browse JavaScript 130 may perform a check, based on the file extension type, to determine whether the visitor has a viewer that is configured to render files of this type (block 305). If the visitor does not have a viewer that is configured to handle the type of file selected by the visitor, the visitor may be prompted to select a different file or to convert the selected file into a supported file type—for example the viewer may be prompted to print the selected file to .pdf format, or the selected file may be automatically converted into a .pdf, and the .pdf version of the file is shared.

In some embodiments, one or more available viewers are downloaded to the visitor when the visitor joins the co-browse session 126, for example in connection with downloading visitor JavaScript 130. For example, viewers for commonly shared file types may be downloaded automatically in connection with downloading the visitor JavaScript 130. Additionally, in some implementations the visitor co-browse JavaScript 130 may be configured to dynamically download a viewer of the correct type from the co-browse service 124 when a viewer selects a file to view. There are many types of file types. By dynamically downloading a viewer to view a file, the visitor does not need to download viewers for all possible file types, but rather can wait until a document is selected to be shared on the co-browse session, and then download the required viewer dynamically based on the file type and visitor browser type.

In some embodiments, when the visitor selects a file 155$_V$ to be viewed, the viewer shows the visitor a preview of the rendered file without transmitting the HTML5 description of the rendered view of the file contents on the co-browse session to the other participants (block 310). This allows the visitor to see the file that was selected, before it is shared, to confirm that the visitor has selected the correct file and allows the visitor to scroll to a desired location in that file. The visitor co-browse JavaScript, in some embodiments, presents the visitor with a dialog in connection with the display of the file preview, to enable the visitor to confirm that the file as shown can be sent to all participants on the co-browse session or to cancel the file share action (block 315). If the visitor clicks cancel, the rendering is deleted and not transmitted on the co-browse session (block 320). If the visitor clicks confirm (block 325), the HTML5 describing the rendered view of the file contents is transmitted to the participants on the co-browse session 126. For documents, each participant views an HTML5 local rendering of the content of the document (block 330). For other media types, such as a video URL or a JavaScript-based application, co-browse service 124 ensures each participant locally renders an exact and locally scalable reproduction of the media (block 335). The particular manner in which audio/video media is handled is described in greater detail below in connection with FIG. 10A.

In some embodiments, the document is displayed in a modal overlayed on top of the web page 120 and the underlying web page 120 that is actively being co-browsed is partially grayed out for all participants. Multiple documents may be simultaneously shared on the co-browse session, although in some embodiments at most one document has focus at a given time. Where multiple documents have been loaded to the visitor browser, the participants can toggle back and forth between the documents to switch which document has focus and appears on the overlay on the co-browse session.

Figure 3B:
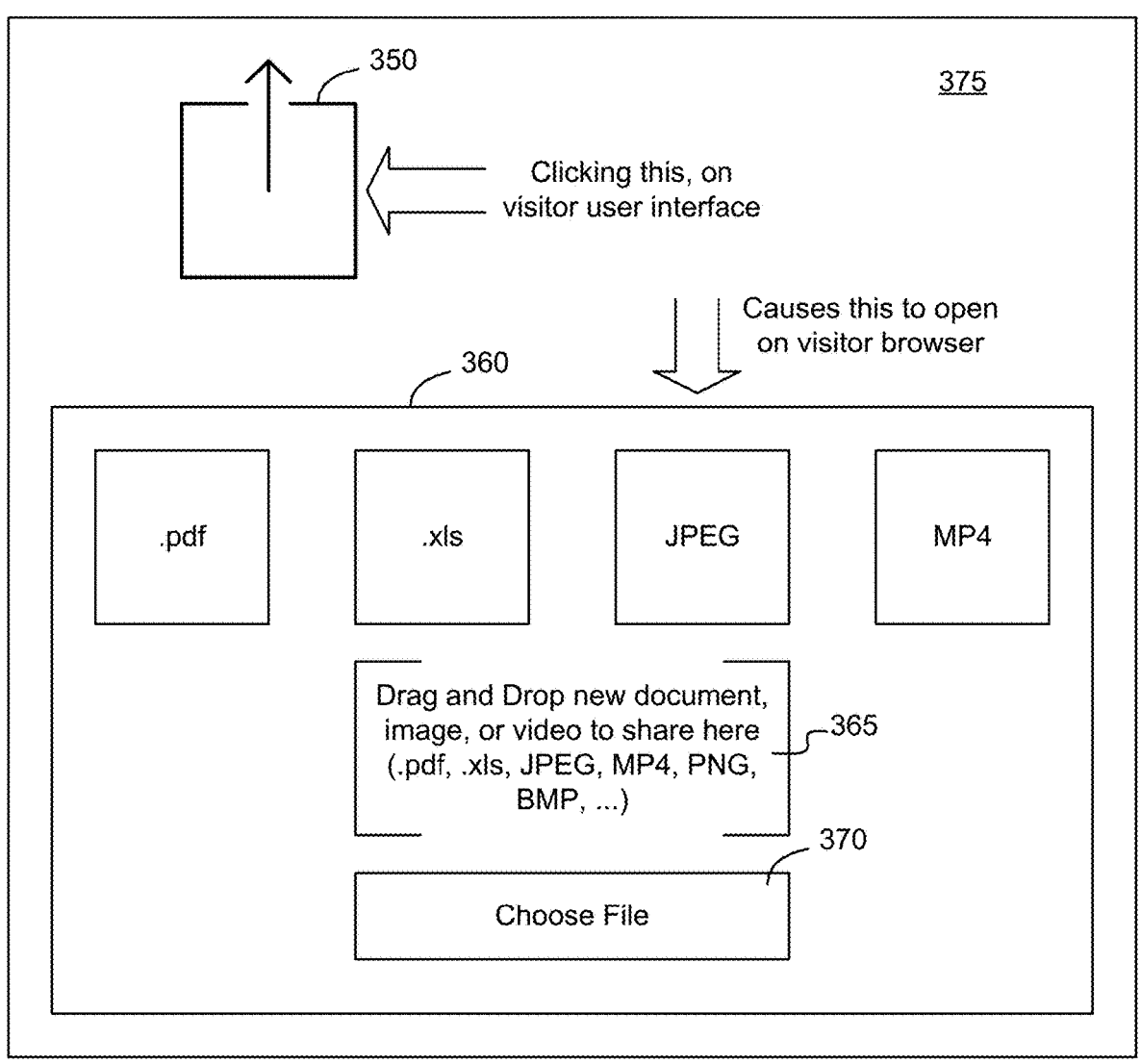
FIG. 3B is a set of example visitor Graphical User Interface (GUI) elements that may be displayed in connection with enabling a visitor to choose a document to be shown on a co-browse session, according to some embodiments.

FIG. 3B is an example Graphical User Interface (GUI) 375 including a set of example visitor GUI elements that may be displayed in connection with enabling a visitor to choose a document to be shown on a co-browse session, according to some embodiments. As shown in FIG. 3B, in some embodiments the visitor user interface includes a first icon 350 that is user-selectable, for example by touching or clicking on the icon. In some embodiments, when the visitor interacts with the first icon 350, a modal 360 is opened on the visitor browser. The user can select one of the thumbnails of already shared documents or media URLs in the modal (boxes labeled .pdf, .xls, JPEG, and MP4 in FIG. 3B), drag and drop a file onto an area 365 of the modal, or use control 370 to choose (using the browser's native file picker) a new document or new media URL to be added to the co-browse session.

Figure 4:
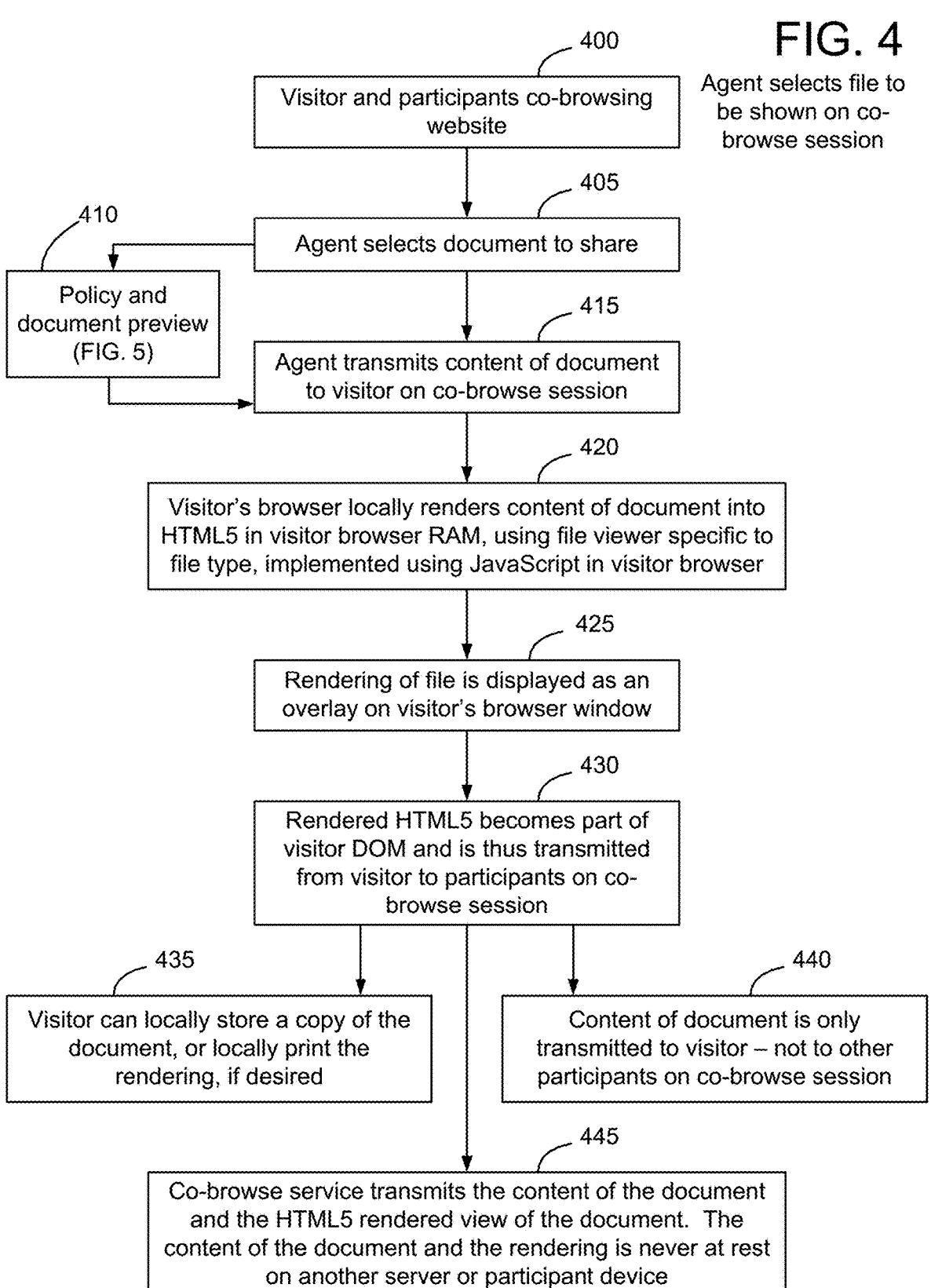
FIG. 4 is a flow chart of a method of selecting a document or media URL to be shown on a co-browse session by an agent, according to some embodiments.

FIG. 4 is a flow chart of a method of selecting a document or media URL to be shown on a co-browse session by an agent, according to some embodiments. As shown in FIG. 4, the participants are co-browsing the visitor's experience on website 116 (block 400). The agent then selects a file or media URL to share (block 405). Optionally, one or more policy checks such as a document preview may be implemented on the file (block 410) as discussed in greater detail in connection with FIG. 5, before the view of the selected document or media URL is sent to participants on the co-browse session.

Once the agent has selected the file, the agent co-browse JavaScript 134 causes the content of the file to be transmitted on the co-browse session to the visitor 110 (block 415). The visitor co-browse JavaScript 130 causes the content of the file to be locally rendered by visitor browser 118 into HTML5 using a viewer 131 specific to the file type (block 420). The viewer 131 is implemented using JavaScript in the visitor browser and causes the file to be rendered in the same manner as a visitor selected file is rendered (as discussed above in connection with FIG. 2). Specifically, the agent-selected file is used to allow visitor browser 118 to locally generate an HTML5 description of the file contents, and the HTML5 rendered view is displayed as an overlay on the visitor's browser webpage 120 (block 425) as part of the co-browse session. The HTML5 describing the rendered view of the file contents of the file is transmitted to all other participants, including the agent, on the co-browse session 126. The file content itself, from the agent 155A, is sent only to visitor browser 118, where it is temporarily cached in the browser's JavaScript RAM, but is never at rest on the servers implementing the co-browse service 124.

By causing the content of the agent-selected file to be transmitted from the agent to the visitor, and then transmitting a HTML5 description of a rendered view of the file contents HTML5 by the visitor as part of the shared DOM on the co-browse session, it is possible for the agent-selected file to be viewed by all participants on the co-browse session without changing the origin of content on the co-browse session. Specifically, rather than having the agent render the document locally and initiate DOM sharing or screen sharing to become the source on the co-browse session, the agent instead forwards the content of the document to visitor browser 118 on the co-browse session, which enables the visitor to remain the sole source of all shared content on the co-browse session. Further, since the visitor has a local copy of file contents in RAM, the visitor could (with privilege) locally store a copy of the file, or locally print the file, if desired (block 435). Finally, the co-browse service securely transmits the file from the agent to the visitor, for example using websocket secure, and then transmits the HTML5 description of a rendering of the file contents from the visitor to the participants, without ever uploading a copy of the file (block 445) to a server in co-browse service 124. This ensures co-browse service 124 never stores at rest PII which may be contained in a shared document. Only visitor browser 110 acquires a copy of the file contents, and stores the file content in visitor browser RAM. When visitor 110 leaves the co-browse session, browser RAM caching the content is released to the visitor's operating system. This is inherently more secure than alternative architectures which upload shared content—which may contain PII (Personally Identifiable Information)—to a publicly visible server.

FIG. 5 is a flow chart of several example policy checks that may be implemented in connection with enabling an agent to choose a file to be shown on a co-browse session, according to some embodiments. An agent may have access to files that the agent's employer would not want shared on a co-browse session. For example, some files may relate to internal matters that should not be shared with visitors. Additionally, an agent might be prohibited from sharing one visitor's files with another visitor. For example, in a banking context, an agent would not want to share a person's bank statement with the wrong person. Accordingly, in some embodiments, a set of checks are implemented to ensure that a file selected to be shared by the agent is appropriately vetted. Although FIG. 5 shows an example set of policy checks, other policy checks may be implemented alternatively or in addition to the policy checks shown in FIG. 5, depending on the implementation.

As shown in FIG. 5, when an agent selects a file using a file finder, a file picker, or by dragging/dropping the file or a URL to a streaming video onto a modal (block 500), in some embodiments a check is performed based on the file type to determine whether the selected file is able to be processed by the visitor (block 505). For example, a check may be performed based on the document extension file type, to determine if the visitor JavaScript has a document viewer configured to render documents of that type of file. If not, the agent may be prompted to select a different document or to export the document into a file type that is supported by the visitor JavaScript, for example by prompting the agent to print the selected document into a .pdf file prior to transmitting the document to the visitor for rendering on the co-browse session.

Additionally, in some embodiments an API in the Agent JavaScript is used to call a policy server to verify that the agent has the authority to share the selected file (block 510). The policy server checks the selected file against an allowed list of approved files that the agent is able to share, which may be based, for example, on agent ID, the role of the agent, the privilege of the agent, the location of the visitor on the website, and the visitor ID (block 515). In some embodiments, the agent is provided with a preview of the document and the ability to confirm/cancel before sending the content of the document to the visitor (block 517). Optionally, since the file is actually being transmitted from the agent to the visitor, contents of the file or metadata about the file could be transmitted via a co-browse JavaScript 130 API to a corporate scanner to check for PII or possible virus/malware (block 520). If the file passes all policy checks, the content of the agent-selected file is transmitted to visitor browser 118 on the co-browse session (block 525) and the visitor browser will then render locally the content of the agent-selected file into HTML5 and display the rendered view of the file in the same way as the visitor would have locally rendered and displayed a visitor-selected file. If the file fails one or more of the policy checks, the agent-selected file is not transmitted to the visitor on the co-browse session, and the agent is notified of the reason for the failure (block 525).

Figure 6A:
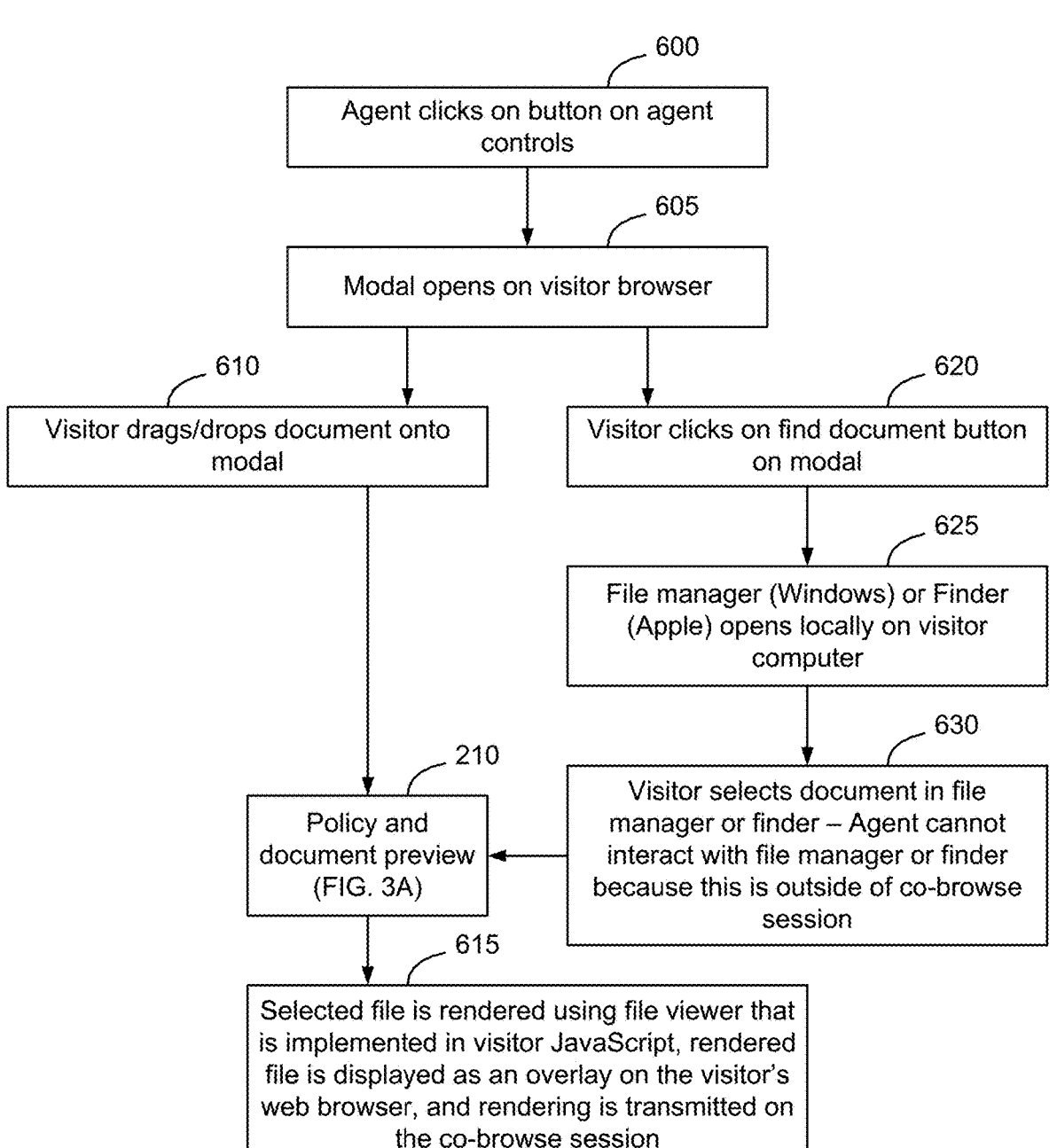
FIG. 6A is a flow chart of a method of enabling an agent to guide a visitor to select a document or media URL to be shown on a co-browse session, according to some embodiments.

FIG. 6A is a flow chart of a method of enabling an agent to guide a visitor to select a file to be shown on a co-browse session, according to some embodiments. In some embodiments, the agent is able to prompt the visitor to select a document to be shared on a co-browse session, for example by clicking on a button on one of the agent controls 125 implemented using agent co-browse JavaScript 134 (block 600). When the agent initiates document sharing, a modal opens on the visitor browser (block 605), which the agent (and other participants) see as part of the co-browse experience 126. The agent can then guide visitor about how to pick a file or where to drag-drop a document into the modal.

When the modal opens, in some embodiments the visitor can select a document to be shared by dragging and dropping the selected document onto the modal (block 610). When this occurs, a file preview is provided to the visitor and the policy checks described in connection with FIG. 3A optionally are performed (FIG. 2 block 210). The viewer 131 at visitor 110 generates a rendered view of the file contents, and the HTML5 description and associated assets of the rendered view of the file becomes part of the visitor DOM and are transmitted to all participants on the co-browse session (block 615). In particular, the selected file is rendered using the file viewer 131 that is implemented in the visitor JavaScript 130, the rendered content is displayed as an overlay on the visitor's browser, and the HTML5 description of the rendered view of the file contents is transmitted on the co-browse session to all participants as part of visitor DOM 122.

Another way for a user to select a file is to browse for the file. For example, in some embodiments, the modal that is opened on the visitor's browser (block 605) includes a "find file" or similarly labeled button (block 620). If the visitor clicks the "find file" button a File Manager (Windows file selection tool) or a Finder (Apple file selection tool) opens local to the browser (block 625). The content of the file selection tool is not accessible by JavaScript 130, so participants cannot see potential PII exposed by the file picker. The File Manager/Finder opens within the browser User Interface (UI) but outside the DOM, and as such this step is not visible to participants. For example, when the File Manager/Finder opens on the visitor's computer, the agent is not able to see the visitor's file structure or any of the visitor's files. The agent, accordingly, cannot interact with the File Manager/Finder because this is outside of the co-browse session, preserving important visitor privacy. When the visitor selects a file (block 630) a document preview is generated and the file is optionally passed through policy checks described in connection with FIG. 3A (FIG. 2 block 210) and then the content of the document is able to be viewed on the co-browse session (block 615).

Figure 6B:
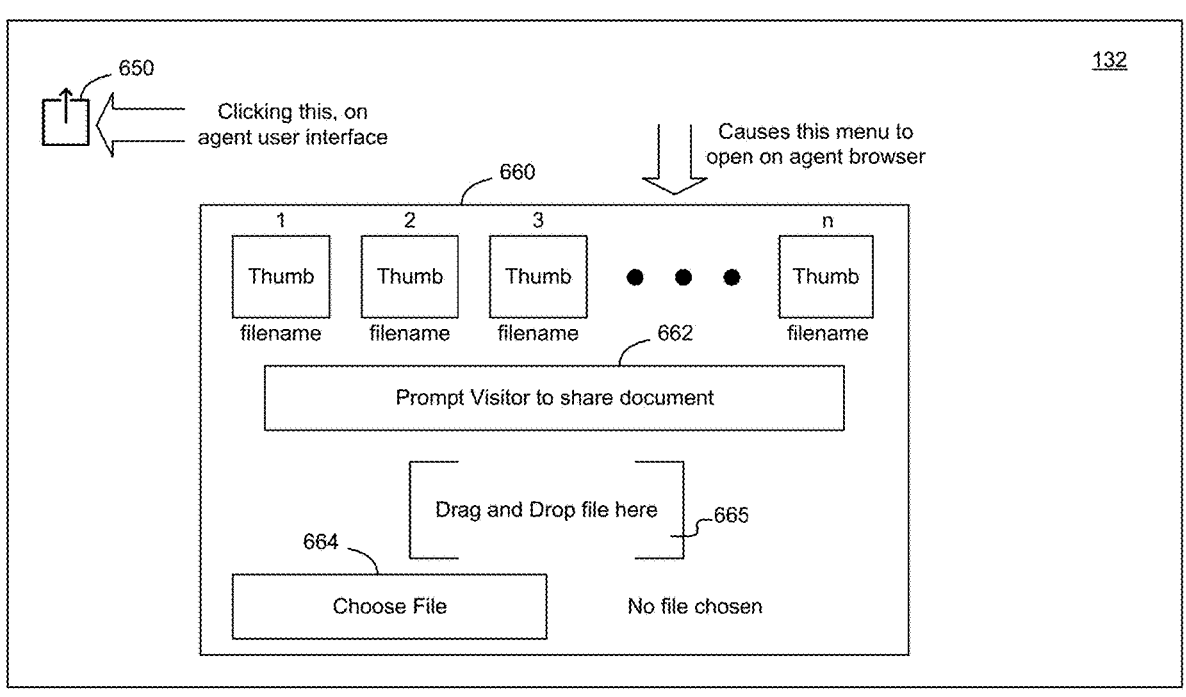
FIG. 6B is an example agent view of a co-browse session containing a control object that the agent can use to prompt a visitor to share a document or media URL, according to some embodiments.

FIG. 6B is an example screen shot of an agent view of an agent page 132 on a co-browse session containing a control 650 that the agent can use to share a document or prompt a visitor to share a document, according to some embodiments. When the agent selects the document sharing control 650, a document sharing dialog 660 is displayed on the agent page 132. The document sharing dialog 660, in some embodiments, has a set of thumbnails representing an allowed list of documents that the agent can select to share on the co-browse session. The dialog 660 also includes a button 662 that the agent can use to request the visitor to share a document, and a button 664 that the agent can use to browse for a document to be shared on the co-browse session 126. The agent can select a document from a list of thumbnails of already uploaded documents, which the agent can choose at any time to show, and the agent can also drag and drop a file onto an area 665 of the dialog 660 to enable the document to be shared on the co-browse session.

Figure 6C:
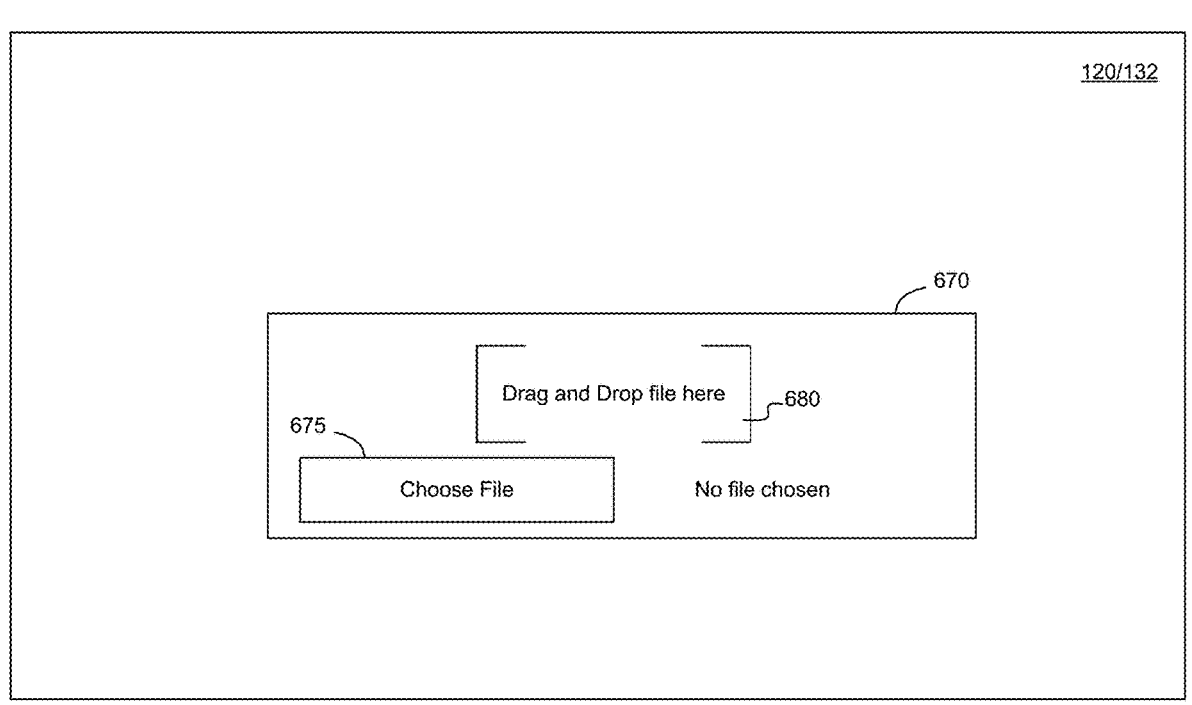
FIG. 6C is an example visitor (and agent) view of the co-browse session that appears when the agent activates the control object to request that a visitor share a document or media URL on the co-browse session, according to some embodiments.

FIG. 6C is an example screen shot of the co-browse session that appears at both the visitor 120 and agent 132, as well as at any other participant, when the agent activates the control (button 662) to request that a visitor share a document on the co-browse session, according to some embodiments. As shown in FIG. 6C, when the agent activates button 662, a modal 670 appears in the visitor browser 118. Since the modal 670 is part of the visitor DOM 122, it is shared by the visitor on the co-browse session so that it will also appear on the agent view 132 and for all participants. The visitor can drag/drop a selected file onto an area 680 of the modal 670, or can use the "choose file" button 675 to select a file using the File Manager/Finder utility described above in connection with FIG. 3B. When a file is selected, in some embodiments a preview of the file is generated which includes controls that the visitor can use to either confirm or cancel inclusion of the document on the co-browse session.

Figure 6D:
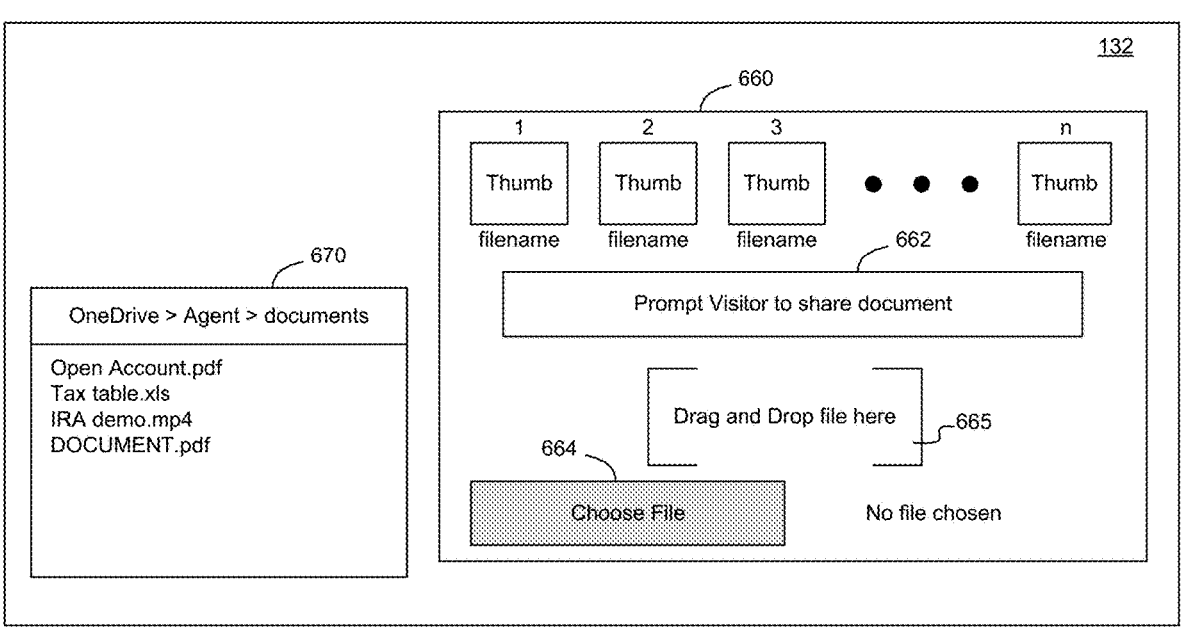
FIG. 6D is an example agent view of a co-browse session containing a control object that the agent can use to select a document or media URL to be shared on the co-browse session and showing a local file finder on the agent computer, according to some embodiments.

FIG. 6D is an example screen shot of an agent view of a co-browse session shown when the agent selects button 664 on document sharing dialog 660 to browse for a document to be included on the co-browse session. As noted above, in some embodiments, the agent can open dialog 660 that the agent can then use to select a document for inclusion on the co-browse session. If the agent selects button 664, a file finder/file picker window 680 opens on agent's browser that the agent can use to select a document. Dialog 660 enables the agent to share the visitor browser's local rendering of multiple types of content, including documents, JavaScript applications, image files, the URL to a publicly visible clip of media, or other forms of content.

Figure 6E:
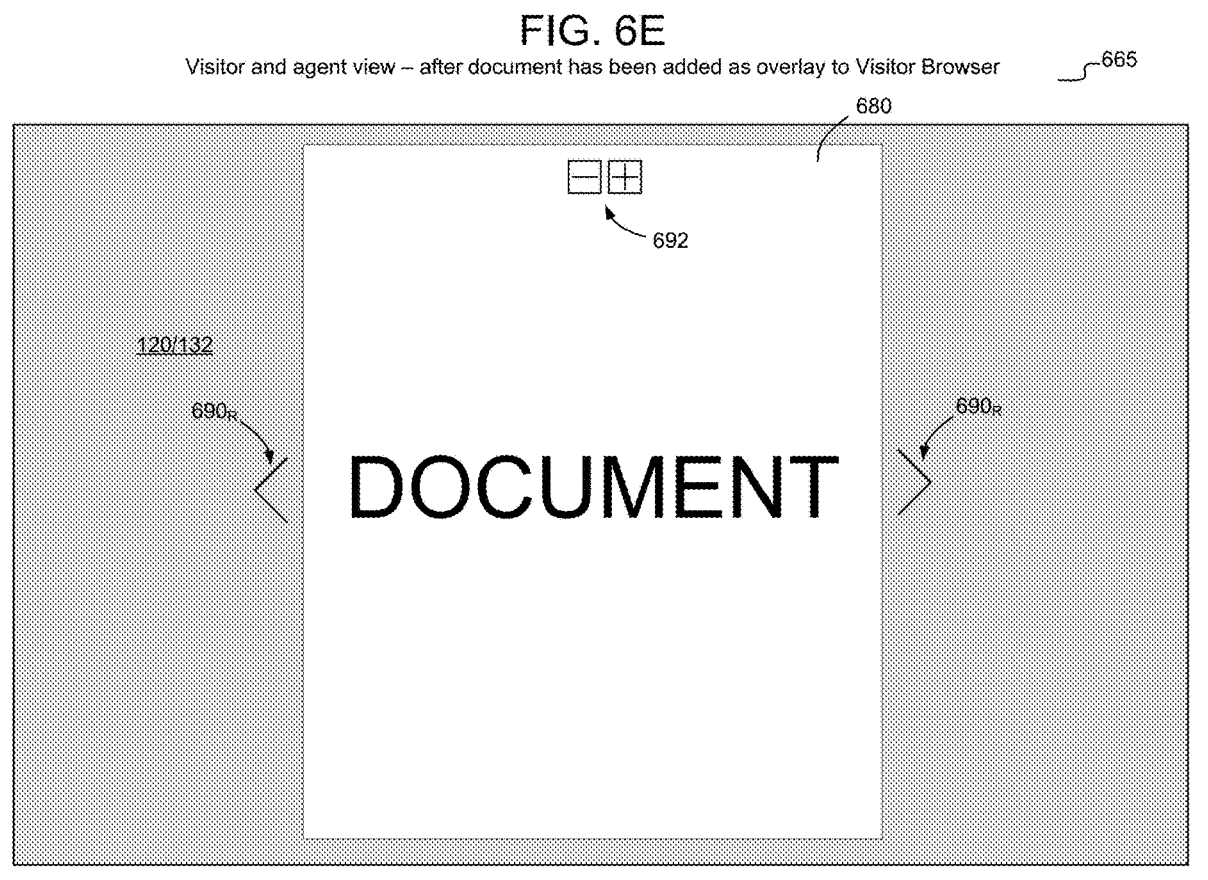

FIG. 6E is an example screen shot showing an example document that has been rendered in an overlay to a website by a visitor browser, and transmitted on the co-browse session, according to some embodiments. Visitor, agent, and guest browsers will display this same exact view of the document. As shown in FIG. 6E, in some embodiments the selected document is displayed in a modal on top of the co-browsed web page 120, and the actively co-browsed web page 132 is partially grayed out while the document is displayed. Pagination controls (arrows 690$_R$, 690$_L$, on either side of the document) are used to move between pages of the document. The document can also be scrolled up/down within a page and the size of the view can be adjusted using zoom "+" and "−" buttons 692 at the top of the page. Any tools supported by the JavaScript viewer 131 can be implemented, including save, print, annotate, edit fields, sign, etc. These tools can be used locally by the visitor, by the agent if the agent has shared control, and optionally by other participants if provided sufficient privilege.

Figure 7A:
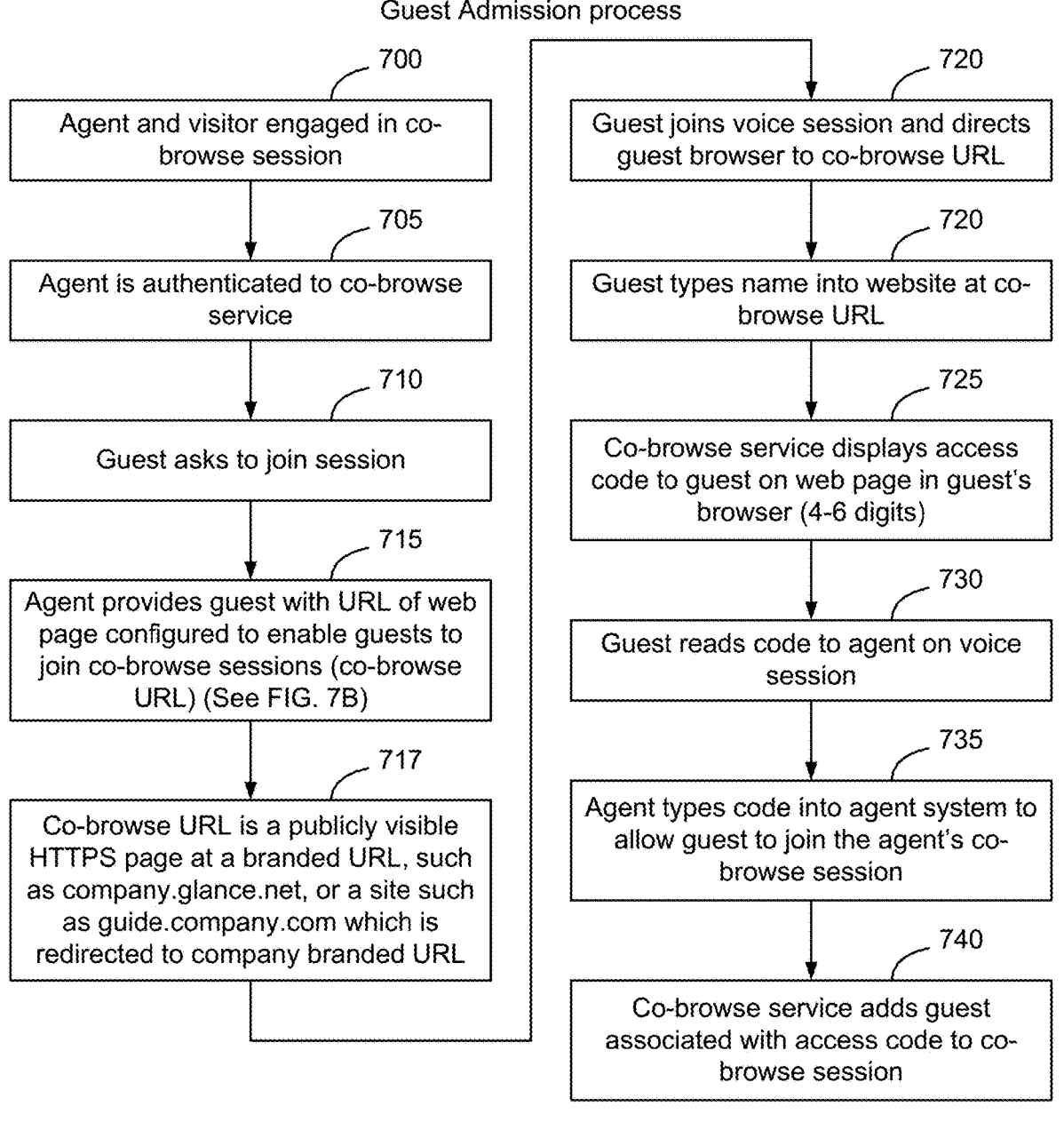
FIG. 7A is a flow chart of a method of an example secure admission process designed to enable a guest to join an existing co-browse session, according to some embodiments.

FIG. 7A is a flow chart of a method of an example secure admission process designed to enable a guest to join an existing co-browse session, according to some embodiments. There are many scenarios where it would be advantageous to enable authorized guests to join a co-browse session. For example, it may be desirable for a spouse, relative, attorney, accountant, etc., to securely join a co-browse session so that they can see the same content that the visitor and agent are seeing.

As shown in FIG. 7A, it is assumed that an agent and visitor are engaged in a co-browse session (block 700), and that the agent has been authenticated to the co-browse service (block 705). In some embodiments, the fact that the agent is authenticated to the co-browse service 124 is leveraged to provide the agent with the ability to admit guests that the agent manually authenticates to the co-browse session. Manual authentication is more secure than emailing a link to the co-browse session, which could be intercepted by a malicious third party.

When a guest asks to join the co-browse session (block 710) the agent clicks on a button on the agent controls 125 to initiate the manual process of admitting the guest to the co-browse session. In some embodiments, the manual process of admitting a guest to the co-browse session includes sending the guest information that the guest can use to join the session (block 715). It is assumed that the guest is already on the out-of-band bridged telephone call and the guest(s) and agent are speaking to one another. For example, the agent can click a button to begin the guest admission process. The click opens a modal offering various ways to direct each guest to a publicly visible webpage. The agent could verbally guide the guest to the webpage, which may be a branded "co-browse URL" like company.glance.net, designed to look like company.com's website. Or it could be a URL to a page on the company's domain, like guide.company.com, which automatically redirects to a company branded page on the co-browse service domain (block 717).

Alternatively, the agent could SMS or chat or text or email the URL to the guest. Tapping on the SMS could automatically make the guest's device connect to the audio bridge. The chat or email could include a QR code for the guest to view with their smartphone camera, which would automatically dial into the voice bridge. Or the landing page can include instructions for dialing into the audio bridge. By using an audio stream separate from the co-browse session, the audio is able to be hosted by the enterprise associated with the agent through its existing corporate telephony call routing and bridging infrastructure for ease, economy, security, and compliance, rather than using a parallel audio service provided by the co-browse service 124.

The guest joins the voice session, and directs their browser to the co-browse URL (block 720). When the guest loads the webpage from the co-browse URL, the web page is served from the co-browse service, on the co-browse service domain, which is the same domain as the agent page 132. This is necessary for the (authenticated) guest to be able to view a co-browse session.

The web page requests the guest's name, and then offers an access code that is approximately four to six digits long, and unique to all guests currently attempting to join sessions on the company.co-browse service.net webpage (block 725). The guest reads the access code to the agent on the voice call (block 730) and the agent types the access code into the agent system (block 735). Co-browse service 124 verifies the access code and redirects guest browser 119 to a page at the co-browse service domain, along with a one-time time-sensitive token generated by co-browse service 124 that authenticates guest 111 to join co-browse session 126 (block 740).

A malicious guest could also visit company.glance.net and see a viable and unique-to-the-company access code. But the code is useless, unless the person verbally tells the code to an agent on an active co-browse session for that company. Hence the access code need only be long enough to distinguish between all guests currently waiting to join sessions for agents providing support for the website 116 at company.com. Security is enforced by the agent verbally performing KYC (Know Your Customer) and manually typing the code to admit guest 111. Because of this in-the-moment verbal KYC manual step by agent 112, the access code, even a very short one, will be useless to malicious guest. It is a form of two-factor authentication.

Other co-browse services send a link to guests, which they can click and be admitted. This is inherently insecure, since anyone intercepting the link can join the session. By requiring the guest to provide a code for the agent, and requiring the agent to enter the code during the co-browse session, it is possible to leverage the agent's authenticated status with the co-browse service to securely admit only authorized guests.

FIG. 7B is an example collection of example of ways an agent might use to invite a guest to connect to a co-browse session, according to some embodiments. As shown in FIG. 7B, in some embodiments the agent can communicate the co-browse URL to the guest by copying/pasting the co-browse URL into a chat stream or into a text message that is then sent to the guest (block 792). The agent can also type the guest telephone number into the agent system, which causes the agent system to autodial the guest and send a text message to the guest with the co-browse URL (block 794). The agent can also click a button to cause an email to be sent to the guest with the co-browse URL and optionally with dial-in information for the audio session (block 796). The agent can also verbally invite the guest to go to the co-browse URL (block 798). Thus, there are many ways for the agent to manually invite the guest to join the co-browse session and the collection of methods shown in FIG. 7B is merely shown as examples.

FIG. 8 is a flow chart of a method of an example admission process designed to enable an additional agent, who—unlike a guest—is already authenticated to the co-browse service 124, to join an active co-browse session, without permission of the first agent, according to some embodiments. In FIG. 8, an agent and a visitor are engaged in a co-browse session (block 800). Additional agents have a variety of ways to instantly join the session.

The first agent often alerts the second agent using some method outside of co-browse service 124. For example, the first agent might use chat, Slack, or use some internal process, to alert the second agent of their need to join this interaction with the visitor. The second agent might look up the active interaction in a CRM or call center desktop. Or the first agent might send a link with metadata identifying the co-browse session key. Additional information about several example ways for agents to locate and join co-browse sessions is disclosed in U.S. Pat. No. 9,736,213, entitled INTEGRATING CO-BROWSING WITH OTHER FORMS OF INFORMATION SHARING, the content of which is hereby incorporated herein by reference. Using any one of these mechanisms, the second agent can simply click directly into the session, because the other agent has privilege as an authenticated agent to do so.

In some embodiments, the first agent can add the second agent to the audio call, and then tell the agent the co-browse session key, which the first agent can see at any time in their co-browse viewer. The key is typically a four to six digit active session identifier. Likewise, in some embodiments an authenticated supervisor can "silently" join the co-browse session, with or without alerting the agent(s), for example to "whisper" guidance to the agent or to simply monitor quality.

The first agent adds a second agent to a voice session, and provides the second agent with a four to six digit co-browse session ID code identifying the co-browse session (block 805). The authenticated second agent then uses the co-browse session ID code to locate and join the co-browse session (block 815). (Note that this is not the four to six digit access code referenced in (block 725).) Optionally, when the second agent seeks to join the co-browse session, the first agent may be asked by the co-browse service for permission to let the second agent join the session, for example where the co-browse session ID codes are available to the agents (block 810). Multiple other connection scenarios are likewise available to enable additional authenticated agents to join as participants with agent privilege on active co-browse sessions.

In some embodiments, co-browse session 126 ends the moment visitor 110 leaves the session, which immediately releases the memory used in visitor browser 118 for temporarily caching document content shared during the session. Thus, no PII contained in shared documents or media sources survives as content at rest after the session ends. The session also ends when the last remaining agent leaves. Guests can come and go at will, but must verbally authenticate with the agent using a valid (random) access code each time they join as discussed in connection with FIG. 7A. In some embodiments, the co-browse service does not distinguish between first, second, third, . . . , agents on co-browse session or control the agent's roles relative to interaction with the visitor and guests. At least one agent must be present for the session to continue, and each agent will have privilege according to their provisioned role, based on the rules established by the call center where the agents are operating. Accordingly, the co-browse system is agnostic to the roles played by the agents, and multiple agents may join, transfer, and escalate, interaction with the visitor, according to the existing transfer processes of the call center in which the agents are operating.

FIG. 9 is a flow chart of a method of masking an agent's view of a website based on agent authorization parameters, according to some embodiments. Some websites are extremely complicated, having hundreds or thousands of pages, and particular agents may be authorized to provide assistance to visitors only on subsets of the website. For example, an insurance company may provide home insurance, health insurance, and life insurance. A particular agent may be licensed to provide assistance to visitors in connection with finding the correct health insurance coverage, but may not be trained to provide assistance to visitors looking to purchase home insurance or life insurance.

In FIG. 9, it is assumed that different agents have differential authorization to provide support to different parts of a website 116, such that a given agent might be authorized to provide support for one aspect of a website but not authorized to provide visitor support for other aspects of the website (block 900). In some embodiments, an API in the agent JavaScript 134 is used to call an internal company.com policy server to collect, in-the-moment, a list of masking rules (typically CSS selectors) of the website 116 based on the particular agent's role and privilege, and the visitor's location on the web page that is about to be co-browsed (block 905). Masking, in co-browse, enables the content of particular elements of the website to be visible to the visitor but not visible to the agent—the masked elements themselves are typically visible on the agent page 132, but the content of the masked elements never leaves visitor browser 118 and the content of the masked elements are not visible to the agent. That way, PII never touches any part of co-browse service 124. For example, if the web page 120 in the visitor browser 118 contains an element showing the visitor's social security number, the content of that element can be masked to prevent the agent from seeing the visitor's social security number. Similarly, a company may mask an action button, like "BUY". The agent will see the button, but even if the agent has shared control, the agent cannot click on the button.

According to some embodiments, the policy server checks the agent's identity, the location of the agent on the website, and dynamically provides a list of masked elements based on the agent ID and location of the agent on the website, and returns a customized list of masking rules (typically CSS selectors) of the website that the agent is not authorized to provide support for (block 910). In some embodiments, masking rules received by the agent from the API are sent to visitor co-browse JavaScript 130 and applied before the visitor co-browse 130 JavaScript sends the initial DOM to co-browse participants. This prevents the agent from seeing content the agent lacks privilege to support. In addition, that PII content never even touches co-browse service 124. It says entirely local to visitor browser 118.

FIG. 10A is a flow chart of an example method of synchronizing a streaming video experience between participants of a co-browse session, according to some embodiments. Video has conventionally been difficult to implement in co-browse, because of the relatively high amount of information that must be transmitted from the visitor to the participants on the co-browse session using screen share technology.

According to some embodiments, instead of capturing and transmitting a screen share of the video from the visitor to the agent and guests on the co-browse session, each participant locally accesses the publicly available video source that is to be viewed during the co-browse session. The visitor and each of the other participants locally plays the video. The visitor acts as the master controller of how the video is played at all of the other participants, to enable display of the video to be synchronized for all participants.

As shown in FIG. 10A, if a video is to be displayed in connection with a co-browse session (block 1000), a publicly available location of the video (URL) is transmitted to all participants on the co-browse session (block 1005). Each participant's video viewer 131 locally connects to the public server of the video stream (block 1010). Each participant then locally starts playing the video at the same time. Because each participant retrieves the video directly from the publicly available video source, and locally starts playing the video, the inclusion of video to be displayed during a co-browse session does not require transmission of the video over the co-browse session 126, thus reducing the bandwidth requirements of the co-browse service. Perhaps more importantly, all the effort invested over the years in browsers to implement ways to reliably render a streamed video despite a myriad of adverse network and device conditions can be invoked by each participant's video viewer 131, and optimized for that participant's instantaneous network and device constraints. A co-browse service which screen shares the same content to all participants would need to implement all of those tricks to do as well of a job. The proposed method avoids that redundant (and continued) development effort.

To synchronize video at each of the participants, in some embodiments the visitor's view of the video is used as the master and the video displayed at all other participants is synchronized with the visitor's view. For example, in some embodiments the visitor video viewer 131 uses the HTML5 video tag to play the media, which exposes metadata, such as the frame number being displayed, control operations such as play, pause, scrub operations, and events to the visitor co-browse JavaScript 130 (block 1015). Scrub operations, in this context, are used to refer to manually moving the playback position of a video to a newly selected location. The visitor co-browse JavaScript 130 forwards relevant metadata and control operations to the participants on the co-browse session (block 1020).

The participants use the metadata and control operations to synchronize the video frame shown at the participant site to the same video frame being shown at the visitor site (block 1025). Optionally, the agent and guest views of the video may be synchronized for network delay, for example by assuming a particular transmission delay associated with transmission of metadata from the visitor to the agent/guest over the network (block 1030) to match the anticipated delay present in the out-of-band bridged phone call. Optionally, the network delay may also be measured by the co-browse service, and used to more accurately adjust the frame synchronization of the agent/guest with the video frame being shown to the visitor.

FIG. 10B is a diagram illustrating one way of detecting and compensating for audio latency in connection with synchronizing video between participants to a co-browse session, according to some embodiments. As shown in FIG. 101B, each participant on the co-browse session locally receives a stream of the audio/video media file from the streaming video source. In some embodiments, each synchronized participant i monitors their unique and dynamic latency Li for the participant's audio path from the visitor to them (block 1050). In FIG. 10B, it is assumed that there is a first latency value L1 on the network path from the visitor to the agent, and a second latency value L2 on the network path from the visitor to the guest.

Participant i video streaming video viewer 131 continuously adjusts the video playback to match the detected latency Li, such that the participant can hear audio from visitor viewer 131 over the bridged phone call, synchronized with the video (block 1055). In some cases, the visitor's viewer 131 may transmit no or very low audio over the bridged call. If so, a participant may choose to enable audio on the participant's video viewer 131 and hear it locally, perhaps after prompting the visitor to temporarily mute their phone audio (block 1060).

As shown in FIG. 10A, participants with sufficient privilege can issue control operations on the video that is locally playing in the participant's browser (block 1035). For example, the visitor, guest, or agent, could issue a control operation such as to cause the video to start playing, pause, restart, or to be scrubbed to a new temporal video location. All control operations are locally captured by the participant JavaScript and forwarded on the co-browse session 126 to be implemented by the other participants. By implementing the control operations locally, the participant taking action will not feel latency, and transmitting the control operations on the co-browse session enables all participants on the co-browse session to remain synchronized with all other participants.

In addition to streaming video (described above) it is possible for live video of the visitor, agent, and guests to be added to a co-browse session as an overlay to the co-browse session. According to some embodiments, live video of the visitor, agent, and guests is able to be controlled, such that the live video takes up most of the visitor browser (large format live video), a small section of the visitor browser (small format live video), or is minimized to take up a minimal amount of area on the visitor browser (minimized format with just a toolbar and no video). Regardless of the mode, all participants are presented with the same format of live video as is seen by the visitor. That way, everyone is aware of any co-browsed content that may be hidden by the live video. Typically, the visitor and agent (and possibly other participants) have privilege by default to change modes to large format, or transition to small format or minimized format overlays, to uncover co-browse or shared document content. Without this privilege, friction would be introduced whenever a non-visitor participant needs to discuss content inadvertently covered by the live video players.

Figure 11:
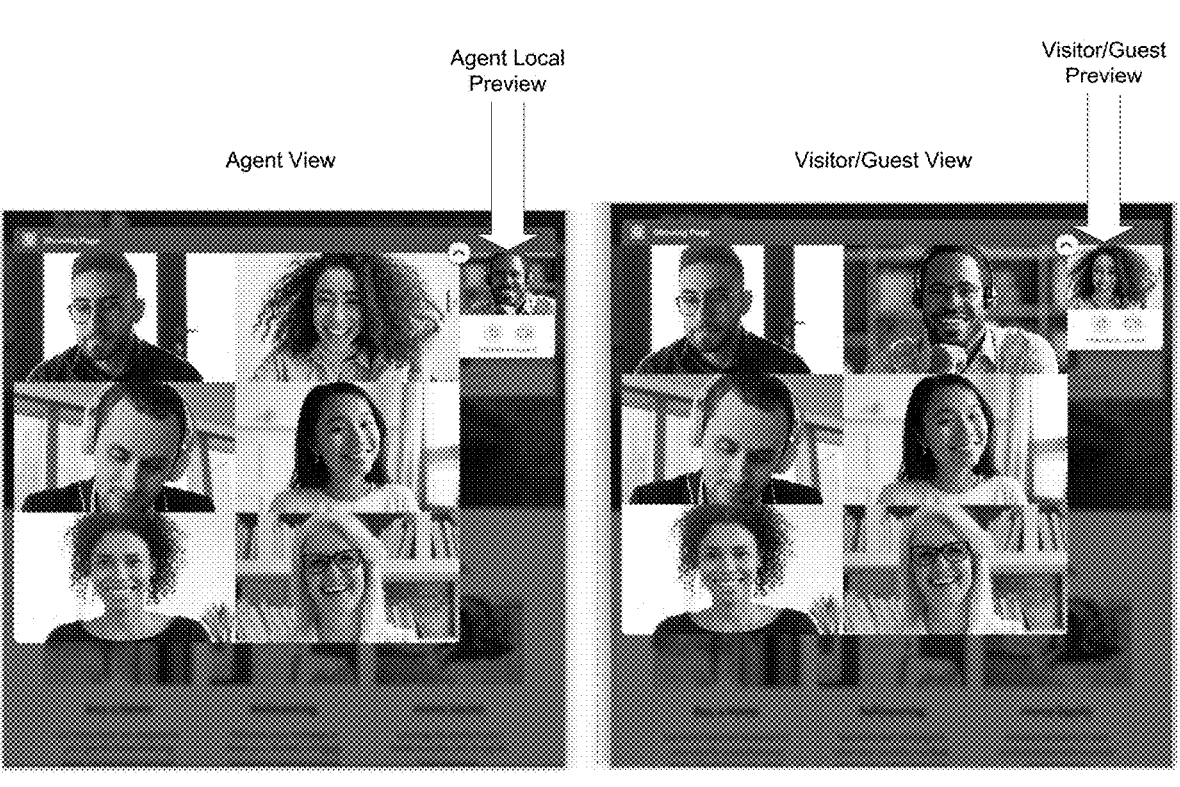
FIG. 11 is a set of two views of a co-browse session, with the visitor/guest view of the co-browse session on the right and the agent view of the co-browse session on the left, showing a large format live participant view video stream overlayed on the co-browse session, according to some embodiments.

FIG. 11 is a set of two views of a co-browse session, with the large-format agent view of the co-browse session on the left and the visitor/guest view of the co-browse session on the right, showing a large format participant video stream overlayed on the co-browse session, according to some embodiments. As shown in FIG. 11, in some embodiments selection of live video to be presented in large format causes the underlying web page 120 that is being co-browsed on the co-browse session to be partially blurred in the background. This enables the participants to focus on the live video, rather than the website, although the website will still respond to actions such as scroll actions by participants. In the visitor view, the visitor is provided with a small display of the visitor's camera, and a larger view of all of the other participants. In the agent view, the agent is provided with a small display of the agent's camera, and a larger view of all of the other participants. Clicking the minimize/maximize button toggles between large format (FIG. 11) and small format (FIG. 12).

Figure 12:
FIG. 12 is a set of two views of a co-browse session, with the visitor/guest view of the co-browse session on the right and the agent view of the co-browse session on the left, showing a small format live participant view video stream overlayed on the co-browse session, according to some embodiments.

FIG. 12 is a set of two views of a co-browse session, with the agent view of the co-browse session on the left and the visitor/guest view of the co-browse session on the right, showing a small format participant video stream overlayed on the co-browse session, according to some embodiments. As shown in FIG. 12, when the small format live video mode is selected, the video overlay is reduced in size and still is implemented as an overlay to the web page 120. However, the webpage 120 is no longer partially grayed, to enable the participants to simultaneously view and interact with the webpage, while still being able to see each other. Where there are multiple participants on the co-browse session 126, a live video streams of a limited number of participants may be shown in the live video overlay. In some embodiments the agent is always shown to the visitor, and the agent and visitor to other guests, but views of other participants may be scrolled by each person. In some embodiments the location of the video overlay is able to be moved by the agent, the visitor, or other participants with sufficient privilege, to be relocated on the web page, for example to access/view the portion of the web page 120 located under the video overlay.

Figure 13:
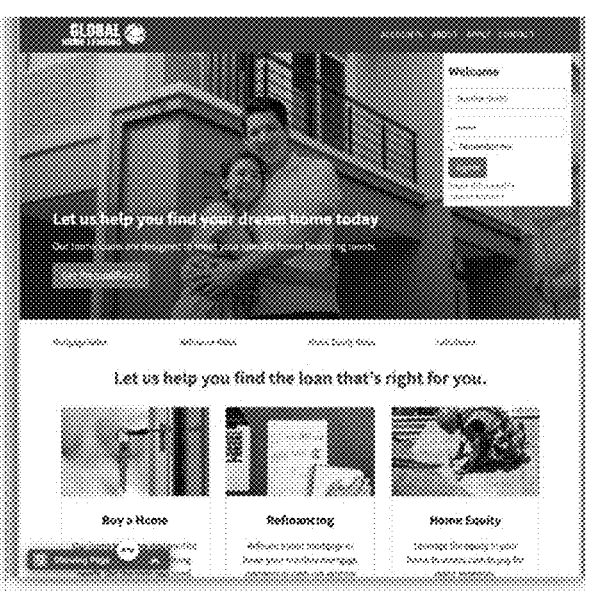
FIG. 13 is a set of two views of a co-browse session, with the visitor/guest view of the co-browse session on the right and the agent view of the co-browse session on the left, showing the live participant view video stream overlay minimized on the co-browse session, according to some embodiments.

FIG. 13 is a set of two views of a co-browse session, with the agent view of the co-browse session on the left and the visitor/guest view of the co-browse session on the right, showing the video stream overlay minimized on the co-browse session, according to some embodiments. As shown in FIG. 13, the video overlay has been minimized to the lower left-hand corner of each of the visitor and agent views. This enables the video overlay to occupy minimal space on the web page 120. In some embodiments, when the video overlay is minimized, all video streams and web cam lights are turned off. If the video is resumed, each participant will need to locally restart their individual video stream by authorizing activation of their local web cam.

In some embodiments, if large format live video is being used on the co-browse session, and the visitor browser window changes size, the size of the video overlay will similarly scale. For example, if the visitor browser is made smaller, the size of the video overlay may scale or optionally show fewer simultaneous participant video streams. If the width of the visitor browser is reduced, instead of having multiple participants shown side-by-side, the participants may all be shown in a single column or a selection of participants may be shown using a single column of live video feeds. Similarly, in small format video the video overlay may show as few as one or two participants, depending on the size of the visitor's browser window 118. This is particularly relevant for a visitor using a smartphone with a tiny screen.

FIG. 14 is a flow chart of an example method of obtaining permission from a participant to initiate visitor-side participant video on a co-browse session, according to some embodiments. Not all participants may want to have a live video view included on the co-browse session 126. Although FIG. 14 will be described in connection with obtaining permission from the visitor to include live video of the visitor on the co-browse session, the same process can also be used to obtain permission to include live video of other participants such as other agents or guests.

As shown in FIG. 14, when a visitor starts or joins a co-browse session (block 1400) the visitor is asked for permission to activate the visitor's camera (block 1405). Asking the visitor for permission to activate their camera is required, because in some embodiments the browser, by default, prompts the user to activate their camera the first time the browser connects to the co-browse service 124.

If permission to activate the camera is denied by the visitor (block 1410) the visitor camera is not activated (block 1415) and live video of the visitor will not be included when initially joining the co-browse session. Live video of the agent and/or other participants may still be included on the co-browse session. In some embodiments, if the visitor initially chooses to deny permission to activate the camera in block 1405, the visitor cannot return to block

1405 to activate the camera. Rather, the visitor will need to access advanced options to explicitly allow camera use on the co-browse session.

If permission to activate the camera is granted (block 1420), in some embodiments the visitor is asked permission to share the camera view on the co-browse session (block 1425). If permission to share the camera view on the co-browse session is granted (block 1430) the live video from the visitor camera view is added to the live video overlay on the co-browse session as the visitor joins (block 1435). If permission to share the camera view on the co-browse session is ignored ("canceled") (block 1406), or is revoked (block 1440) the live video from the visitor camera view is not added to the live video overlay on the co-browse session (block 1445) and the web cam light never turns on. If the agent re-enables the agent's webcam, only the agent webcam transmits video on the co-browse session (block 1450). Each other participant must manually re-enable their webcam, by clicking their local webcam on/off button (block 1455). In some embodiments, If the visitor just closes the modal (block 1406) (e.g., clicks or taps the X button on the modal) the webcam stays off, but the visitor can return to block 1405 during the co-browse session by clicking their webcam icon "ON" (block 1407). The browser again asks permission to access the webcam for the co-browse service's domain. Clicking "Allow" turns on the camera light and the visitor sees a preview of the webcam. Visitor can then choose to leave it on or turn it off before re-joining the co-browse session. Once the visitor allows camera access, the browser stores the vserver's domain in an "allow list", so the visitor will not be prompted in future sessions (block 1407).

In some embodiments, during a session a visitor can toggle their cameral on/off button to turn the camera off/on. Each time the camera is turned on, the process returns to block 1405 where the visitor's browser requests permission to activate the camera (block 1460).

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, computer instructions that are stored on a non-transitory tangible computer-readable medium and implemented by multi-purpose tangible processors, and any combinations thereof.

The methods described herein may be implemented as software configured to be executed in control logic such as contained in a CPU of an electronic device such as a computer. The functions described herein may be implemented as sets of program instructions that are stored in a non-transitory tangible computer readable medium. When implemented in this manner, the computer program includes a set of instructions which, when executed by a computer, cause the computer to perform a method to implement the functions described above. Programmable logic can be fixed temporarily or permanently in a non-transitory tangible computer readable medium such as a read-only memory chip, a computer memory, a disk, or other storage medium. In addition to being implemented in software, the logic described herein can be embodied using discrete components, integrated circuitry, programmable logic used in conjunction with a programmable logic device such as a Field Programmable Gate Array (FPGA) or microprocessor, or any other device including any combination thereof. All such embodiments are intended to fall within the scope of the present invention.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:

1. A method of incorporating streaming video on a co-browse session, the method including the steps of:

establishing a co-browse session in which a Document Object Model (DOM) describing content of a first browser and changes to the DOM describing changes to the content of the first browser are shared with a second browser, to enable the second browser to recreate the content of the first browser and have a consistent view of the content of the first browser;

sharing a Uniform Resource Locator (URL) of a publicly available location of a media resource on the co-browse session, the media resource providing the source of the streaming video;

retrieving the media resource from the publicly available location and locally playing the media resource in the first browser;

retrieving the media resource from the publicly available location and locally playing the media resource in the second browser;

collecting streaming video metadata and streaming video control information associated with playing the media resource at the first browser;

transmitting the streaming video metadata and streaming video control information on the co-browse session from the first browser to the second browser on the co-browse session; and synchronizing local playing of the media resource on the second browser with playing of the media resource on the first browser, using the streaming video metadata and control information by the second browser.

2. The method of claim 1, wherein streaming video control information includes control operations including play, pause, and scrub operations.

3. The method of claim 1, further comprising compensating for transmission delay associated with transmission of the streaming video metadata and streaming video control operations from the first browser to the second browser on the co-browse session.

4. The method of claim 3, wherein compensating for transmission delay comprises measuring a first network delay value between the first browser and a co-browse service implementing the co-browse session intermediate the first browser and second browser, measuring a second network delay value between the co-browse service and the second browser, and using the measured first and second delay values to adjust the streaming video metadata used by the second browser to determine a frame number of the streaming video to be displayed at the second browser.

5. The method of claim 1, further comprising:

entering a streaming video control operation by the second browser;

locally applying the streaming video control operation to the locally playing media resource in the second browser;

forwarding the streaming video control operation from the second browser to the first browser on the co-browse session; and implementing the streaming video control operation on the locally playing media resource in the first browser.

6. The method of claim 1, further comprising synchronizing an external audio source with the streaming video by detecting latency of each of the participants, and locally adjusting the external audio source based on the detected latency.

7. The method of claim 1, wherein the streaming video metadata includes a frame number being displayed.

* * * * *